United States Patent
Kapale et al.

(10) Patent No.: US 12,302,456 B2
(45) Date of Patent: May 13, 2025

(54) METHOD AND SYSTEM TO CREATE, UPDATE AND REMOVE THE BINDING OF FUNCTIONAL ALIAS WITH MCX GROUP

(71) Applicant: Samsung Electronics Co., Ltd., Gyeonggi-do (KR)

(72) Inventors: Kiran Gurudev Kapale, Bangalore (IN); Arunprasath Ramamoorthy, Bangalore (IN); Vijay Sangameshwara, Bangalore (IN); Basavaraj Jayawant Pattan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 312 days.

(21) Appl. No.: 17/956,067

(22) Filed: Sep. 29, 2022

(65) Prior Publication Data

US 2023/0097212 A1 Mar. 30, 2023

(30) Foreign Application Priority Data

Sep. 29, 2021 (IN) .............................. 202141044302
Jun. 22, 2022 (IN) .............................. 202141044302

(51) Int. Cl.
*H04W 8/26* (2009.01)
*H04L 61/30* (2022.01)
(Continued)

(52) U.S. Cl.
CPC ............... *H04W 8/26* (2013.01); *H04L 61/30* (2013.01); *H04L 65/1104* (2022.05)

(58) Field of Classification Search
CPC . H04L 2101/35; H04L 61/30; H04L 65/1016; H04L 65/1104; H04L 65/4061; H04W 8/26
See application file for complete search history.

(56) References Cited

U.S. PATENT DOCUMENTS

| 2012/0016998 A1* | 1/2012 | Kumarasamy | .......... H04L 67/14 |
| | | | 709/228 |
| 2018/0131730 A1 | 5/2018 | Leis et al. | |

(Continued)

FOREIGN PATENT DOCUMENTS

| EP | 3 799 387 | 3/2021 | |
| WO | WO-2021190754 A1 * | 9/2021 | ......... H04L 65/1046 |
| WO | WO-2022033679 A1 * | 2/2022 | |

OTHER PUBLICATIONS

3GPP TS 36.579-1 v15.2.0, 3rd Generation Partnership Project; Technical Specification Group Radio Access Network; Mission Critical (MC) Services over LTE; Part1: Common Test Environment (Release 15), Jun. 2021, 550 pages.

(Continued)

*Primary Examiner* — Asghar H Bilgrami
(74) *Attorney, Agent, or Firm* — The Farrell Law Firm, P.C.

(57) ABSTRACT

The disclosure relates to a 5G or 6G communication system for supporting a higher data transmission rate. Disclosed is a method for binding or unbinding a functional alias with at least one mission critical services (MCX) group in an MCX network, including creating or updating, by an MCX server, an association of a functional alias with the at least one MCX group when the SIP message request is received to create binding of the functional alias with at least one MCX group, or disassociating by the MCX server an association of the functional alias with the at least one MCX group when the SIP message request is received to remove the binding of the functional alias with the at least one MCX group, and sending, by the MCX server, an SIP message response to MCX client device confirming whether the creation or removal of binding of the functional alias with the at least one MCX group is successful or unsuccessful.

16 Claims, 11 Drawing Sheets

(51) Int. Cl.
*H04L 65/1016* (2022.01)
*H04L 65/1104* (2022.01)
*H04L 65/4061* (2022.01)
*H04W 4/10* (2009.01)

(56) References Cited

U.S. PATENT DOCUMENTS

2019/0098692 A1* 3/2019 Atarius ............... H04L 65/1069
2019/0335328 A1* 10/2019 Ben Henda ........... H04W 12/04

OTHER PUBLICATIONS

International Search Report dated Jan. 6, 2023 issued in counterpart application No. PCT/KR2022/014592, 6 pages.
3GPP TS 22.280 v18.0.0, Sep. 2021, Technical Specification 3rd Generation Partnership Project; Technical Specification Group Services and System Aspects; Mission Critical Services Common Requirements (MCCoRe); Stage 1 (Release 18), pp. 100.
3GPP TS 23.280 v17.8.0, Sep. 2021, Technical Specification 3rd Generation Partnership Project; Technical Specification Group Services and System Aspects; Common functional architecture to support mission critical services; Stage 2 (Release 17), pp. 275.
3GPP TS 24.484 v17.3.0, Sep. 2021, Technical Specification 3rd Generation Partnership Project; Technical Specification Group Core Network and Terminals; Mission Critical Services (MCS) configuration management; Protocol specification (Release 17), pp. 234.
3GPP TS 24.483 v17.4.0, Sep. 2021, Technical Specification 3rd Generation Partnership Project; Technical Specification Group Core Network and Terminals; Mission Critical Services (MCS) Management Object (MO) (Release 17), pp. 462.
3GPP TS 24.282 v17.4.0, Sep. 2021, Technical Specification 3rd Generation Partnership Project; Technical Specification Group Core Network and Terminals; Mission Critical Data (MCData) signalling control; Protocol specification (Release 17), pp. 452.
3GPP TS 24.379 v17.4.0, Sep. 2021, Technical Specification 3rd Generation Partnership Project; Technical Specification Group Core Network and Terminals; Mission Critical Push to Talk (MCPTT) call control; Protocol specification (Release 17), pp. 654.
3GPP TS 24.229 v17.4.0, Sep. 2021, Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 17), pp. 1080.
3GPP TS 24.380 v17.4.0, Sep. 2021, Technical Specification 3rd Generation Partnership Project; Technical Specification Group Core Network and Terminals; Mission Critical Push to Talk (MCPTT) media plane control; Protocol specification (Release 17), pp. 287.

* cited by examiner

METHOD AND SYSTEM TO CREATE, UPDATE AND REMOVE THE BINDING OF FUNCTIONAL ALIAS WITH MCX GROUP

CROSS-REFERENCE TO RELATED APPLICATION(S)

This application is based on and claims priority under 35 U.S.C. § 119 to Indian Provisional Patent Application No. 202141044302, filed in the Indian Patent Office on Sep. 29, 2021, and Indian Non-Provisional Patent Application No. 202141044302, filed in the Indian Patent Office on Jun. 22, 2022, the disclosures of which are incorporated herein by reference in their entireties.

BACKGROUND

1. Field

The disclosure relates generally to wireless communications, and more particularly, to mission critical services (MCX) such as mission-critical push-to-talk (MCPTT), mission-critical data (MCData) and mission-critical video (MCVideo).

2. Description of Related Art

The MCX service provides a usage of functional alias (FA) in MCX group communication to identify an MCX user with a specific role and to define a set of rules based on the functional alias usage and number of MCX user activations to the functional alias. The disclosure provides a method and system to associate a functional alias with a particular MCX group or set of MCX groups.

Fifth generation (5G) mobile communication technologies define broad frequency bands enabling high transmission rates and new services and can be implemented in both sub 6 gigahertz (6 GHz) bands such as a 3.5 GHz band, and in above 6 GHz millimeter wave (mmWave) bands such as 28 GHz and 39 GHz bands. In addition, it has been considered to implement sixth generation (6G) mobile communication technologies, referred to as beyond 5G systems, in terahertz (THz) 30 bands such as 95 GHz to 3 THz bands in order to accomplish transmission rates fifty times faster than 5G mobile communication technologies and ultra-low latencies one-tenth of 5G mobile communication technologies.

When the development of 5G mobile communication technologies began, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting operating multiple sub-carrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amounts of data transmission and a polar code for highly reliable transmission of control information, L2 pre-processing, and network slicing for providing a dedicated network to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio user equipment (NR UE) power saving, non-terrestrial network (NTN) which is a UE-satellite direct communication for providing coverage in unreliable communication with terrestrial networks areas, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture, such as service based architecture or interface, for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Thus, it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The current technical specification 3d generation partnership project (TS 3GPP) 22.280 defines numerous requirements to support a functional alias and usage in number of functionalities. In particular, certain requirements mandate an MCX server to understand how the activated function alias(es) are associated to an MCX group. This association of a specific functional alias being activated by an MCX user with a particular MCX group or set of MCX groups is/are required when the MCX server wants to apply a policy to prevent the MCX user being activated a specific functional alias with revoking their affiliation with a specific MCX group, wants to apply the policy to prevent the MCX user from revoking his/her affiliation with a specific MCX group if the MCX user is the only MCX user in the MCX group activated a specific functional alias, wants to share the functional alias identities of the connected MCX users during a communication, to the MCX user participants of the communication, and to provide, upon request, the list of currently affiliated members of an MCX group which encompasses the MCX user ID and the associated functional aliases of each member of the MCX group.

As specified in 3GPP TS 23.280, the MCX client device creates a functional alias to group binding association to be stored within the group controlling MCX server. A functional alias is bound to a group until the functional alias is unbound with the group. Currently, the prior art lacks any procedure to provide a mechanism or method using the protocol to bind/unbind the functional alias to/from a particular MCX group or set of MCX groups. As such, there is a need in the art for a method and apparatus to perform this binding/unbinding of a functional alias with one or more MCX groups.

SUMMARY

Aspects of the disclosure are to address at least the above-mentioned problems and/or disadvantages and to provide at least the advantages described below. Accordingly, an aspect of the disclosure is to provide a system and a method to create and remove the binding of a functional alias with an MCX group.

Another aspect of the disclosure is to provide a system and method for an MCX user to request an MCX server to create an association of a specific functional alias activated by the MCX user with an MCX group or set of MCX groups.

In accordance with an aspect of the disclosure, a method for binding or unbinding the functional alias with at least one MCX group in an MCX network includes receiving, by an MCX server, a session initiation protocol (SIP) message request to an MCX client device to create a binding of the functional alias with or remove the binding of the functional alias with the at least one MCX group, authorizing, the MCX client device in response to receiving the SIP message request, creating or updating, an association of the functional alias with the at least one MCX group when the SIP message request is received to create the binding of the functional alias with at least one MCX group, or disassociating by the MCX server an association of the functional alias with the at least one MCX group when the SIP message request is received to remove the binding of the functional alias with the at least one MCX group, and transmitting, to the MCX client device, an SIP message response confirming whether the creation of the functional alias with or removal of binding of the functional alias with the at least one MCX group is successful or unsuccessful.

In accordance with another aspect of the disclosure, a method for binding or unbinding the functional alias with at least one MCX group in an MCX network, includes generating, an SIP message request to create the binding of the functional alias with or remove the binding of functional alias with the at least one MCX group in the MCX network, transmitting, to the MCS server, the SIP message request to create the binding of the functional alias with or remove the binding of the functional alias with the at least one MCX group, and receiving, from the MCX server, an SIP message response confirming whether the creation or removal of binding of the functional alias with the at least one MCX group is successful or unsuccessful.

In accordance with another aspect of the disclosure, an MCX server for binding or unbinding the functional alias with at least one MCX group in an MCX network includes a communicator, a functional alias association controller, communicatively coupled to the communicator and configured to receive an SIP message request to an MCX client device to create the binding of the functional alias with or remove the binding of the functional alias with the at least one MCX group, authorize the MCX client device in response to receiving the SIP message request, create or update an associated of the functional alias with the at least one MCX group when the SIP message request is received to create the binding of the functional alias with the at least one MCX group, or disassociating by the MCX server an associated functional alias with at least one MCX group when the SIP message request is received to remove the binding of the functional alias with at least one MCX group, and transmit an SIP message response to the MCX client device confirming whether the creation or removal of the binding of the functional alias with at least one MCX group is successful or unsuccessful.

In accordance with another aspect of the disclosure, an MCX client device for binding or unbinding the functional alias with at least one MCX group in an MCX network includes a communicator, and a functional alias association controller communicatively coupled to the communicator and configured to generate a session initiation protocol (SIP) message request to create the binding of the functional alias with or remove the binding of the functional alias with the at least one MCX group in the MCX network, transmit the SIP message request to the MCX server to create the binding of the functional alias with or remove the binding of the functional alias with the at least one MCX group, and receive an SIP message response from the MCX server confirming whether the creation or removal of the binding of the functional alias with the at least one MCX group is successful or unsuccessful.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
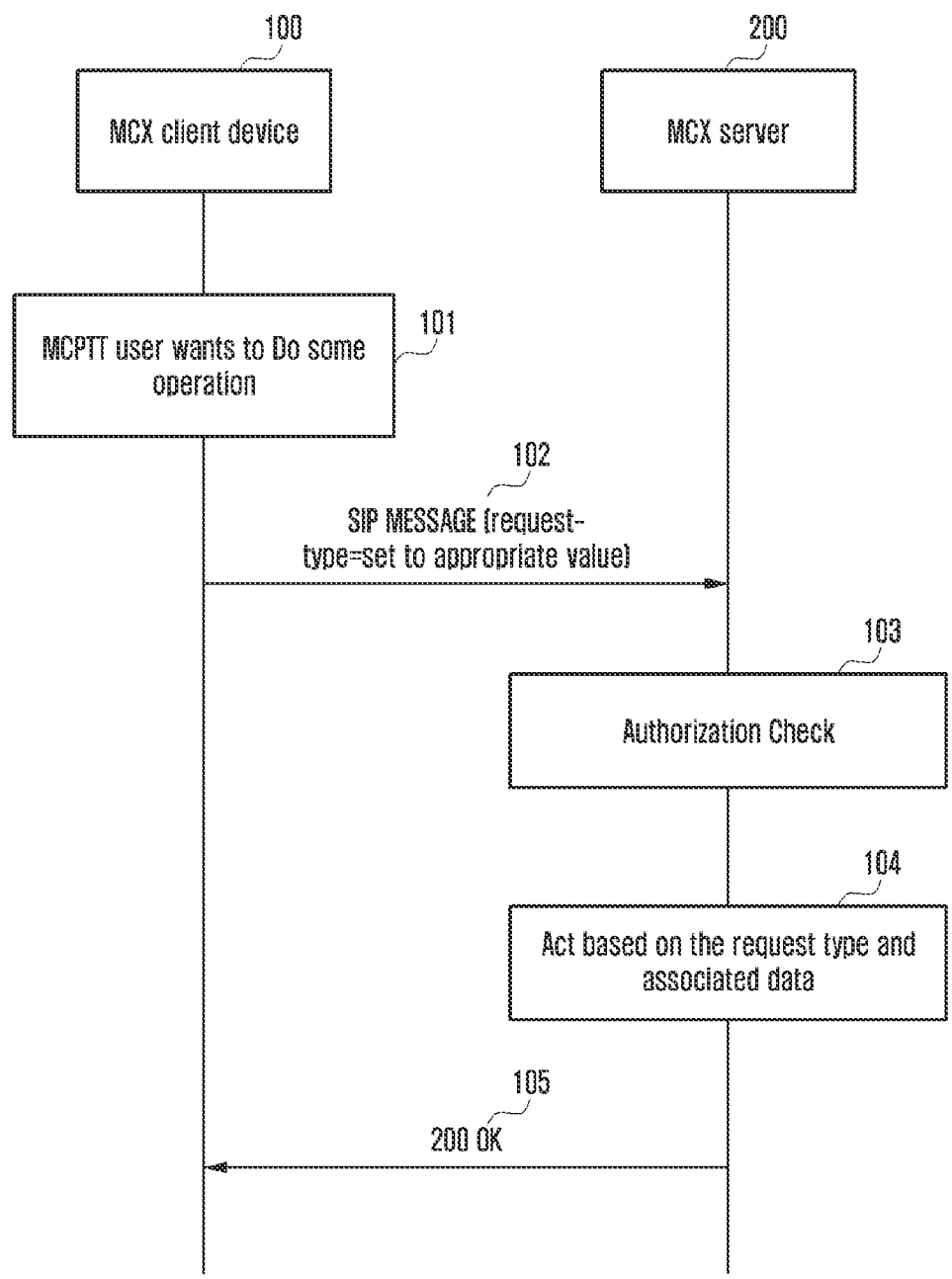
FIG. 1 illustrates a procedure of an MCPTT client device to request for creating binding information of a functional alias with and removing binding information of a functional alias with a list of MCPTT group(s) using new extensible markup language (xml) schema.

Embodiments herein are explained more fully with reference to the accompanying drawings. Descriptions of well-known functions and configurations are omitted so as to not obscure the embodiments herein. The embodiments described herein are not necessarily mutually exclusive, as some embodiments can be combined with one or more other embodiments to form new embodiments. The term "or" as used herein, refers to a non-exclusive or, unless otherwise indicated. The examples described herein should not be construed as limiting the scope of the embodiments herein.

Embodiments may be described and illustrated in terms of blocks which perform a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may be embodied in one or more semiconductor chips, or on substrate supports such as printed circuit boards. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks or may be physically combined into more complex blocks without departing from the scope of the disclosure.

The expressions MCPTT client device and MCX client device are used interchangeably in the patent disclosure, as are the expressions MCPTT server and MCX server.

Embodiments herein to provide a method for binding or unbinding the functional alias with at least one MCX group in an MCX network. The method includes receiving, by an MCX server, an SIP message request to an MCX client device to create a binding of the functional alias with or remove the binding of the functional alias with the at least one MCX group, including authorizing, by the MCX server, the MCX client device in response to receiving the SIP message request, creating or updating, by the MCX server, an association of the functional alias with the at least one MCX group when the SIP message request is received to create the binding of the functional alias with at least one MCX group, or disassociating by the MCX server an association of the functional alias with the at least one MCX group when the SIP message request is received to remove the binding of the functional alias with the at least one MCX group, and sending, by the MCX server, an SIP message response to the MCX client device confirming whether the creation or removal of binding of the functional alias with the at least one MCX group is successful or unsuccessful.

The disclosed system and method enable the MCX user to request the MCX server to create an association of a specific functional alias being activated by an MCX user with a particular MCX group or set of MCX groups. The method is implemented in a public safety and railways system.

The disclosed method addresses the association of a specific functional alias being activated by the MCX user with a particular MCX group or set of MCX groups, which is currently not disclosed in the prior art. This association of a specific functional alias being activated by an MCX user with a particular MCX group or set of MCX groups is necessary when an MCX server wants to apply certain rules or policies to prevent the MCX user from de-affiliating from an MCX group, sending the MCX group affiliated MCX user information with associated functional alias(es) and sharing the functional alias of the participants of the call during MCX communications.

The disclosure sets forth how to associate a specific functional alias being activated by an MCX user with a particular MCX group or set of MCX groups. The request sip method MESSAGE is used for carrying the information, and any other suitable sip method messages may be used. Herein, the MCPTT service is disclosed as an example service to explain the system, procedures, and configuration required to support association of the functional alias with the MCX group(s). Similar procedures are applicable for other MCXs including but not limited to MCData and MCVideo.

FIG. 1 illustrates a procedure of the MCPTT client device to request for creating binding information of a functional alias with and removing the binding information of the functional alias with a list of MCPTT groups using new xml schema, according to the prior art.

In step 101, it is determined by the MCPTT (or MCX) user to perform an operation. In step 102, the MCPTT (or MCX) client device (100) sends the SIP message to the MCPTT server (200), wherein the SIP message includes a request-type=set to appropriate value. In step 103, the MCPTT server (200) performs the authorization check. In step 104, the MCPTT server (200) performs an action based on the request type and associated data. In step 105, the MCPTT server (200) sends the 200 OK to the MCPTT client.

Figure 2:
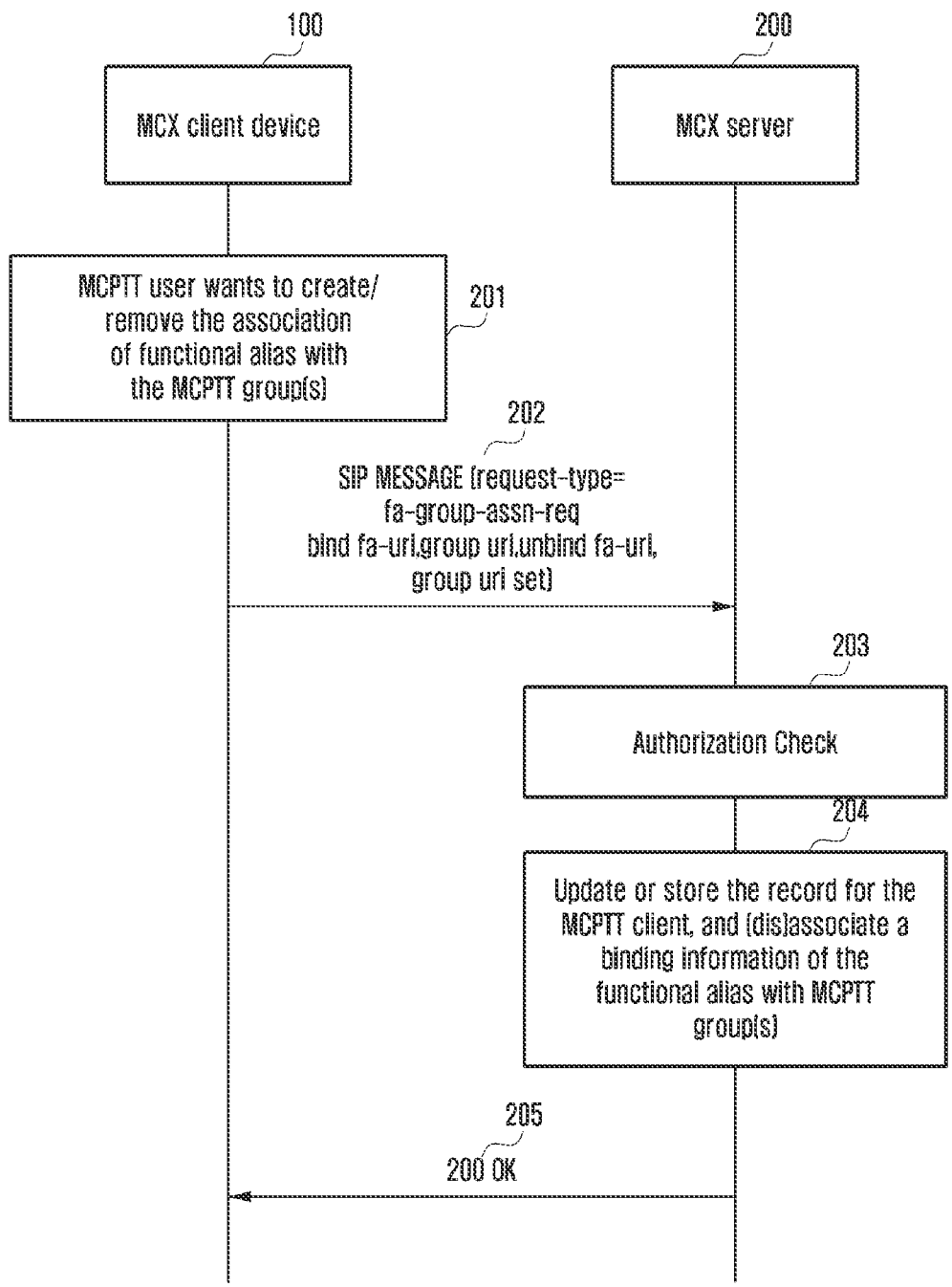
FIG. 2 illustrates a procedure of an MCPTT client device to request for creating binding information of the functional alias with and removing the binding information of the functional alias with a list of MCPTT groups using new xml schema, according to an embodiment.

FIG. 2 illustrates a procedure of the MCPTT client device (100) to request for creating binding information of the functional alias with and removing binding information of the functional alias with a list of MCPTT group(s) using new xml schema, according to an embodiment.

In step 201, it is determined by the MCPTT user to create or remove the association of functional alias with the MCPTT group(s). In step 202, the MCPTT client device (100) sends the SIP MESSAGE including the request-type=fa-group-assn-req bind fa-uri,group uri,unbind fa-uri, group uri set to the MCPTT server (200), wherein URI refers to a uniform resource identifier. In step 203, the MCPTT server (200) performs an authorization check. In step 204, the MCPTT server (200) updates or stores the record for the MCPTT client and associates a binding information of the functional alias with or disassociates the binding information of the functional alias with MCPTT group(s). In step 205, the MCPTT server (200) sends the 200 OK message to the MCPTT client device (100).

Figure 3A:
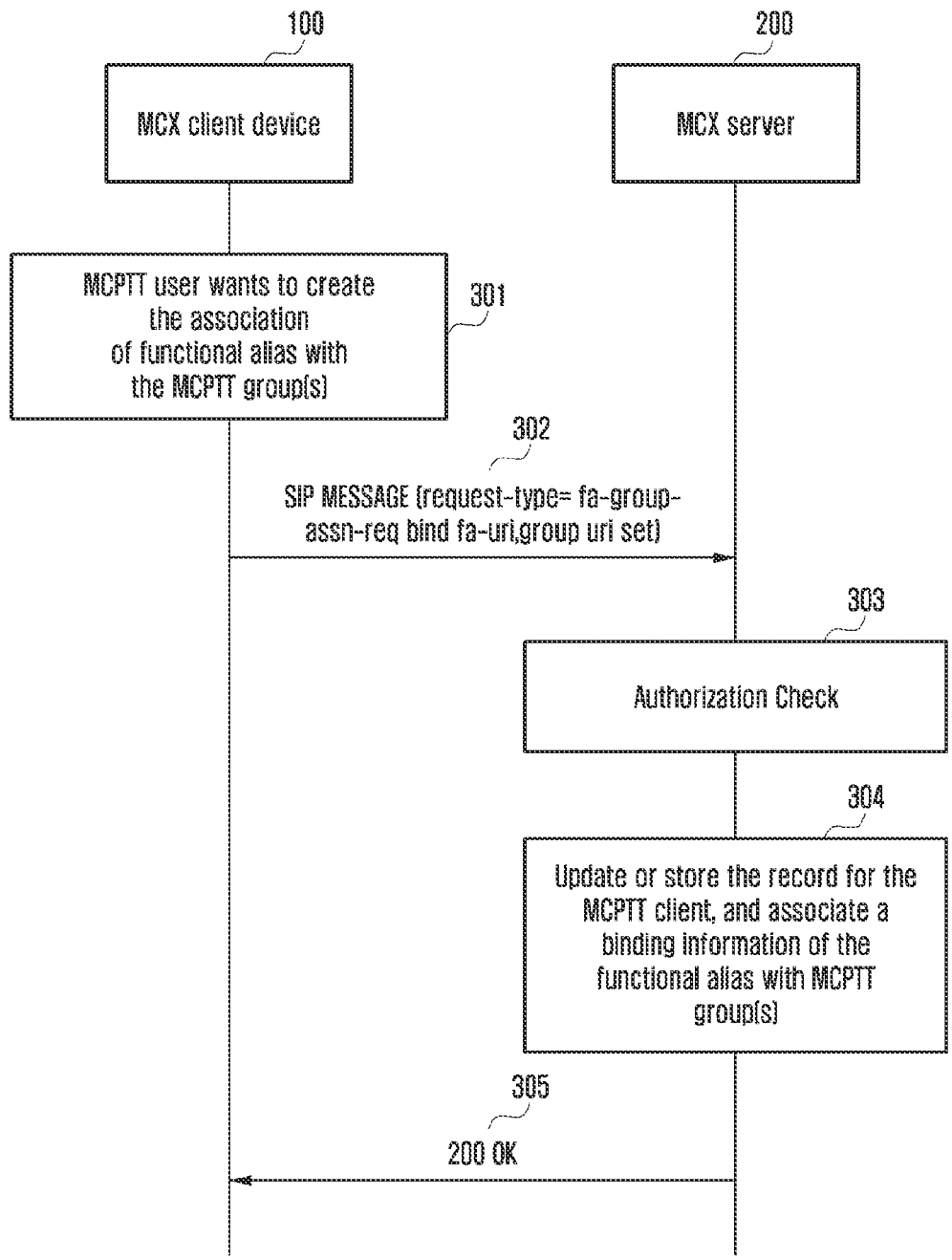
FIG. 3A illustrates a procedure of the MCPTT client device to request for creating binding information of the functional alias with a list of MCPTT group(s) using new xml schema, according to an embodiment.

FIG. 3A illustrates a procedure of the MCPTT (or MCX) client device (100) to request for creating binding information of the functional alias with a list of MCPTT group(s) using new xml schema, according to an embodiment.

In step 301, it is determined by the MCPTT user to create the association of functional alias with the MCPTT group(s). In step 302, the MCPTT client device (100) sends the SIP MESSAGE including the request-type=fa-group-assn-req bind fa-uri,group uri set to the MCPTT server (200). In step 303, the MCPTT server (200) performs the authorization check. In step 304, the MCPTT server (200) updates or stores the record for the MCPTT client device (100), and associates a binding information of the functional alias with MCPTT group(s). In step 305, the MCPTT server (200) sends the 200 OK to the MCPTT client device (100).

Figure 3B:
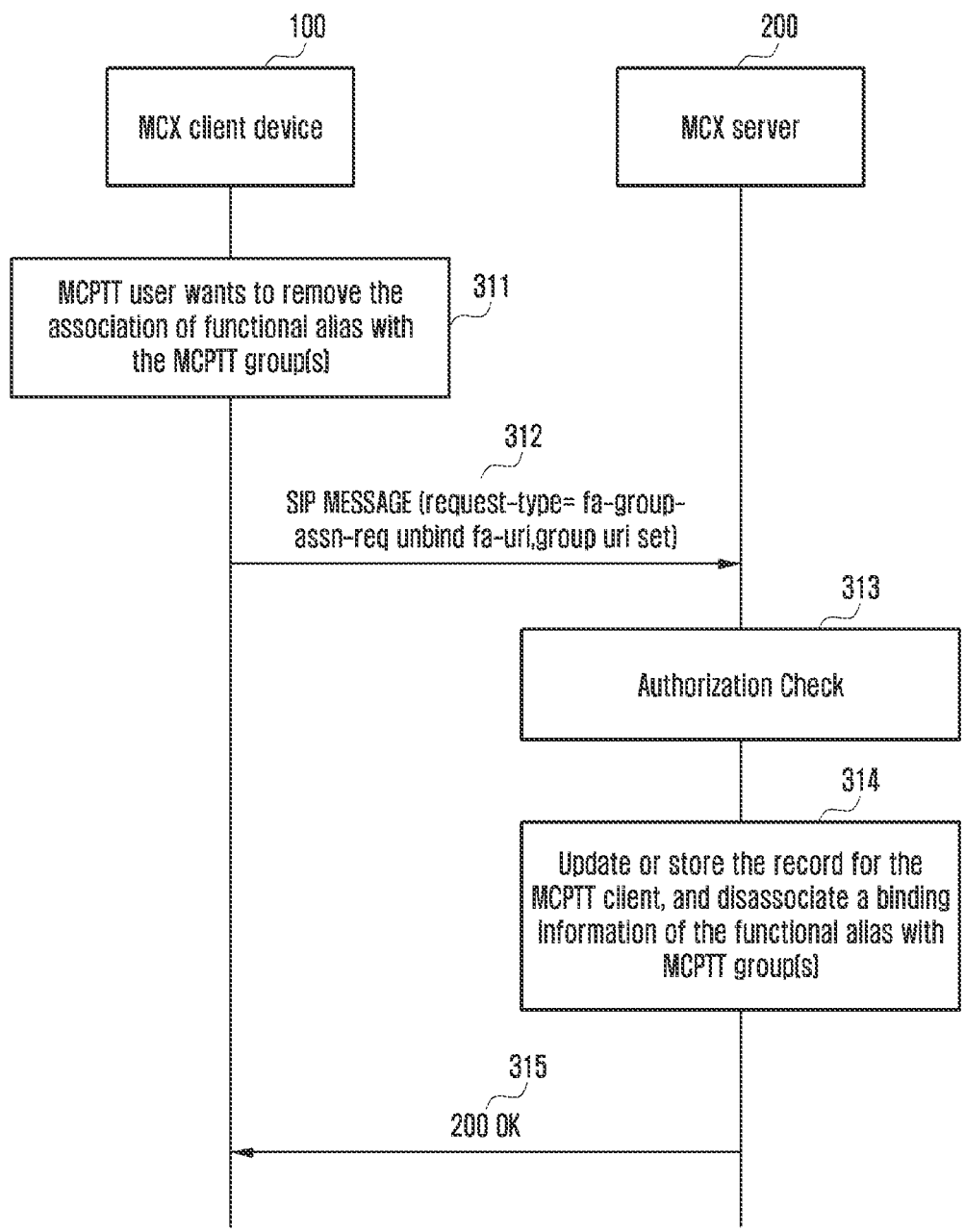
FIG. 3B illustrates a procedure of an MCPTT client device to request for removing binding information of the functional alias with a list of MCPTT group(s) using new xml schema, according to an embodiment.

FIG. 3B illustrates a procedure of an MCPTT client device (100) to request for removing binding information of the functional alias with a list of MCPTT group(s) using new xml schema, according to an embodiment.

In step 311, it is determined by the MCPTT user to remove the association of functional alias with the MCPTT group(s). In step 312, the MCPTT client device (100) sends the SIP MESSAGE including the request-type=fa-group-assn-req unbind fa-uri,group uri set to the MCPTT server (200). In step 313, the MCPTT server (200) performs the authorization check. In step 314, the MCPTT server (200) updates or stores the record for the MCPTT client device (100), and disassociates a binding information of the functional alias with MCPTT group(s). At 5, the MCPTT server (200) sends the 200 OK to the MCPTT client.

Figure 4A:
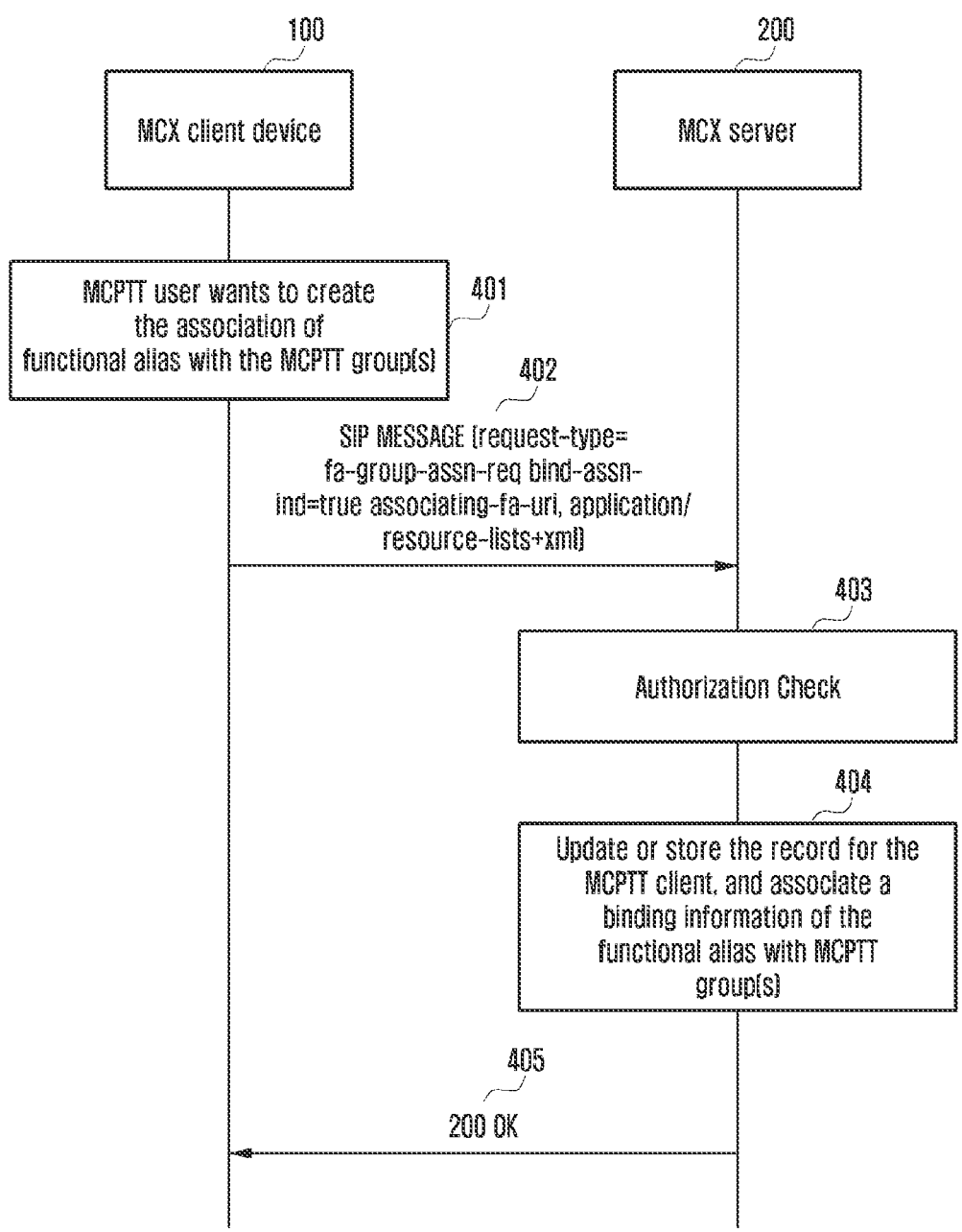
FIG. 4A illustrates a procedure of an MCPTT client device to request for creating binding information of the functional alias with a list of MCPTT group(s) using existing application/resource-lists xml schema, according to an embodiment.

FIG. 4A illustrates a procedure of an MCPTT client device (100) to request for creating binding information of the functional alias with a list of MCPTT group(s) using new xml schema, according to an embodiment.

In step 401, it is determined by the MCPTT user to create the association of functional alias with the MCPTT group(s). In step 402, the MCPTT client device (100) sends the SIP MESSAGE including the request-type=fa-group-assn-req bind-assn-ind=true associating-fa-uri, application/resource-lists+xml to the MCPTT server (200). In step 403, the MCPTT server (200) performs the authorization check. In step 404, the MCPTT server (200) updates or stores the record for the MCPTT client device (100) and associates the binding information of the functional alias with MCPTT group(s). In step 405, the MCPTT server (200) sends the 200 OK to the MCPTT client device (100).

Figure 4B:
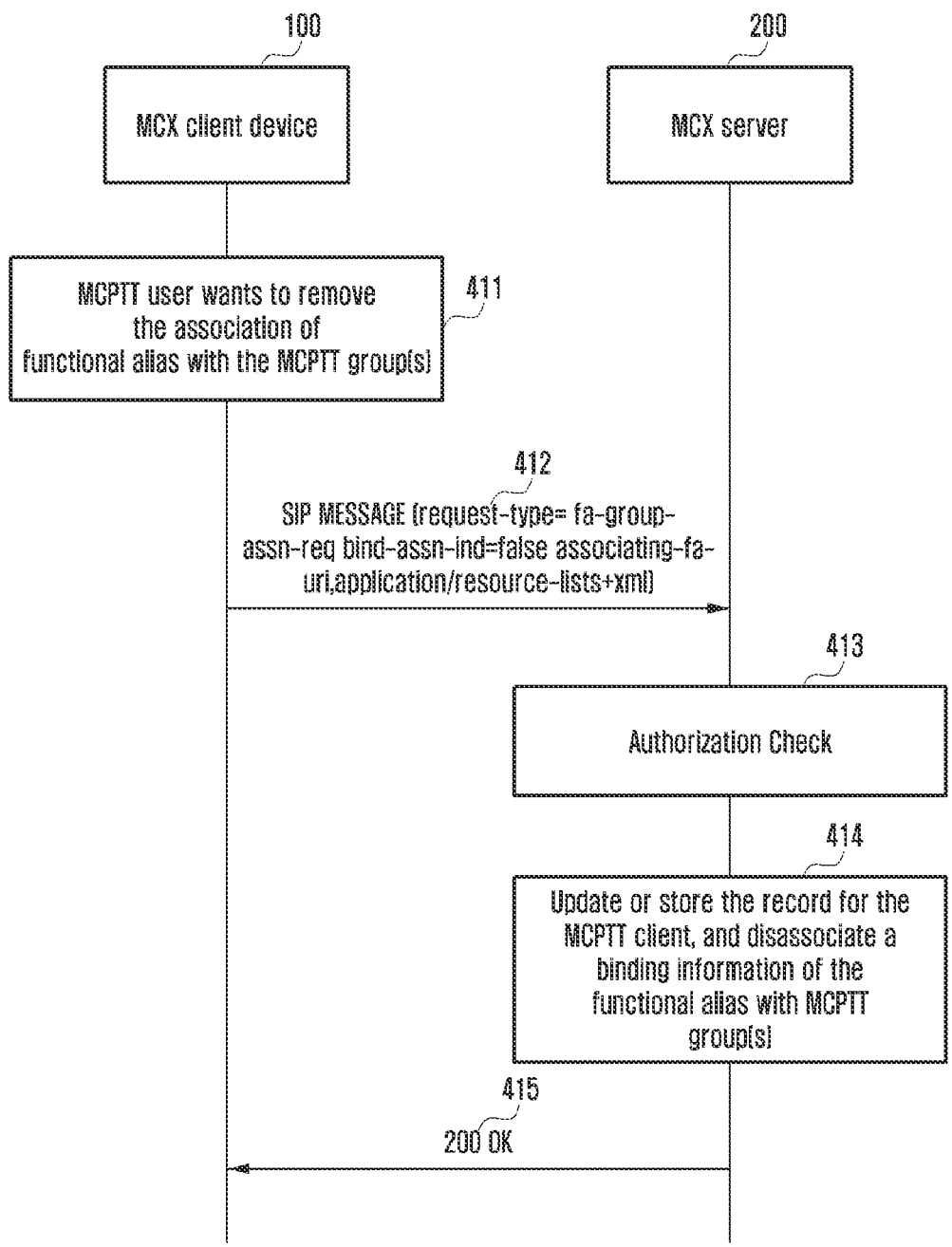
FIG. 4B illustrates a procedure of an MCPTT client device to request for removing binding information of the functional alias with a list of MCPTT group(s) using existing application/resource-lists xml schema, according to an embodiment.

FIG. 4B illustrates a procedure of the MCPTT client device (100) to request for removing binding information of the functional alias with a list of MCPTT group(s) using new xml schema, according to an embodiment.

In step 411, it is determined by the MCPTT user to remove the association of functional alias with the MCPTT group(s). In step 412, the MCPTT client device (100) sends the SIP MESSAGE including the request-type=fa-group-assn-req bind-assn-ind=false associating-fa-uri,application/resource-lists+xml to the MCPTT server (200). In step 413, the MCPTT server (200) performs the authorization check. In step 414, the MCPTT server (200) updates or stores the record for the MCPTT client device (100) and disassociates the binding information of the functional alias with the MCPTT group(s). In step 405, the MCPTT server (200) sends the 200 OK to the MCPTT client device (100).

Figure 5:
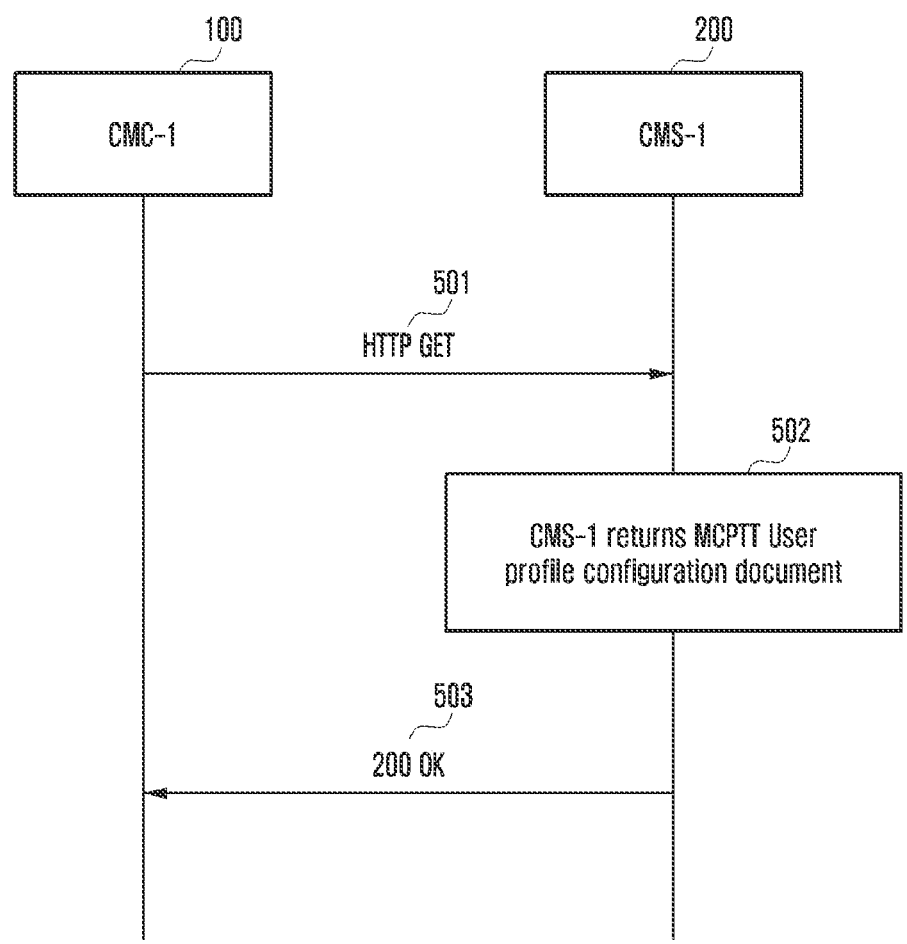
FIG. 5 illustrates configuration parameters defined under a user profile document for an entirety of services, according to an embodiment.

FIG. 5 illustrates configuration parameters defined under a user profile document for an entirety of services, according to an embodiment.

In step 501, the configuration management client-1 (CMC-1) (500) sends a hypertext transfer protocol get (HTTP GET) message to a configuration management server-1 (CMS-1) (510). In step 502, the CMS-1 returns MCPTT user profile configuration document. In step 503, the CMS-1 (510) sends the 200 OK to the CMC-1 (500).

A new MCPTT user profile discloses a new action in the ruleset for the user to allow/disallow performing a particular operation.

Table 1 below illustrates values of an <allow-functional-alias-association-with-group> element of type Boolean, and corresponds to the "AllowedFunctionalAliasAssociationWithGroup" element of clause 1 in 3GPP TS 24.483.

TABLE 1

| "true" | Instructs the MCPTT server performing the originating participating MCPTT function for the MCPTT user, that the MCPTT user is authorized to request the association of particular functional alias with a group or list of the groups using the procedures defined in 3GPP TS 24.379. |
| "false" | Instincts the MCPTT server performing the originating participating MCPTT function for the MCPTT user, that the MCPTT user is not authorized to request the association of particular functional alias with a group or list of the groups and reject such requests using the procedures defined in 3GPP TS 24.379. |

The disclosed method sets forth new schema for application/vnd.3gpp.mcptt-fa-group-assn-request+xml and is defined below for MCPTT signaling control protocol specification document (TS 24.282).

```
<?xml version="1.0" encoding="UTF-8" ?>
<xs:schema         xmlns:xs="http://www.w3.org/2001/XMLSchema"
targetNamespace="urn:3gpp:ns:faGroupAssnRequest:1.0"
xmlns:mcpttfagroupassn="urn:3gpp.ns:faGroupAssnRequest: 1.0"
attributeFormDefault="unqualified"
elementFormDefault="qualified">
  <xs:complexType name="bind-command">
    <xs:sequence>
      <xs:element name="group" type="mcpttfagroupassn:groupType" minOccurs="1" maxOccurs="unbounded"/>
      <xs:any namespace="##other" processContents="lax" minOccurs="0" maxOccurs="unbounded"/>
      <xs:element name="anyExt" type="mcpttfagroupassn:anyExtType" minOccurs="0"/>
    </xs:sequence>
    <xs:attribute name="fa-uri" type="xs:anyURI" use="required"/>
    <xs:anyAttribute namespace="##any" processContents="lax"/>
  </xs:complexType>
```

```
<xs:complexType name="unbind-command">
<xs:sequence>
    <xs:element name="group" type="mcpttfagroupassn:
groupType" minOccurs="1" maxOccurs="unbounded"/>
<xs:any namespace="##other" processContents="lax"
minOccurs="0" maxOccurs="unbounded"/>
<xs:element name="anyExt" type="mcpttfagroupassn:any-
ExtType" minOccurs="0"/>
</xs:sequence>
<xs:anyAttribute                    namespace="##any"
processContents="lax"/>
</xs:complexType>
<xs:complexType name="groupType">
<xs:sequence>
    <xs:any namespace="##other" processContents="lax"
        minOccurs="0" maxOccurs="unbounded"/>
    <xs:element name="anyExt" type="mcpttfagroupassn:
        anyExtType" minOccurs="0"/>
</xs:sequence>
    <xs:attribute       name="uri"       type="xs:anyURI"
use="required"/>
    <xs:anyAttribute                    namespace="##any"
processContents="lax"/>
</xs:complexType>
<!--root XML element for command list of Functional
Alias—Group association XML document-->
<xs:element name="fa-group-assn-list">
<xs:complexType>
<xs:sequence>
<xs:element name="bind" type="mcpttfagroupassn:bind-
command" minOccurs="0" maxOccurs="unbounded"/>
<xs:element name="unbind" type="mcpttfagroupassn:
unbind-command"                         minOccurs="0"
maxOccurs="unbounded"/>
<xs:element name="anyExt" type="mcpttfagroupassn:any-
ExtType" minOccurs="0"/>
<xs:any namespace="##other" processContents="lax"
minOccurs="0" maxOccurs="unbounded"/>
</xs:sequence>
    <xs:anyAttribute                    namespace="##any"
processContents="lax"/>
</xs:complexType>
</xs:element>
<xs:complexType name="any ExtType">
<xs:sequence>
<xs:any namespace="##any" processContents="lax"
minOccurs="0" maxOccurs="unbounded"/>
</xs:sequence>
</xs:complexType>
</xs:schema>
```

The <fa-group-assn-list> element is the root element of the XML document. The <fa-group-assn-list> element may contain zero or more <bind> and/or <unbind> sub elements.

If the <fa-group-assn-list> contains the <bind> element with the "fa-uri" attribute set to a particular functional alias URI to which a list of groups needs to be associated, then the <bind> element contains a list of <group> sub elements with each sub element containing a "uri" attribute set to a group uri and having at least one <group> sub element. The recipient shall create a binding of a particular functional alias URI with all the MCPTT groups contained in the list for the MCPTT client device (100) for which the <fa-group-assn-list> applies.

If the <fa-group-assn-list> contains the <unbind> element with the "fa-uri" attribute set to a particular functional alias URI to which a list of groups needs to be disassociated, then the <unbind> element contains a list of <group> sub elements with each sub element containing a "uri" attribute set to a group uri and having at least one <group> sub element. The recipient shall remove a binding of a particular functional alias URI with all the MCPTT groups contained in the list for the MCPTT client device (100) for which the <fa-group-assn-list> applies.

The recipient of the XML disregards any unknown element and any unknown attribute.

The disclosed method offers the following changes to the MCPTT signaling control protocol specification document (TS 24.379).

Solution 1: The below solution covers the method for associating a functional alias to a list of MCPTT groups for an MCPTT user on an MCPTT client device using stand-alone procedure.

SIP MESSAGE request—The MCPTT server needs to distinguish between the following SIP MESSAGE request for originations and terminations:

SIP MESSAGE requests routed to the originating participating MCPTT function as a result of initial filter criteria with the request-URI set to the public service identity of the participating MCPTT function and containing a content-type header field set to "application/vnd.3gpp.mcptt-info+xml" and including an XML body containing a <mcpttinfo> root element containing a <mcptt-Params> element containing an <anyExt> element with the <request-type> element set to a value of "fa-group-assn-req". Such requests are disclosed herein as "SIP MESSAGE request for association of a functional alias with the MCPTT group(s) for originating participating MCPTT function.".

SIP MESSAGE requests routed to the controlling participating MCPTT function as a result of initial filter criteria with the request-URI set to the public service identity of the participating MCPTT function and containing a content-type header field set to "application/vnd.3gpp.mcptt-info+xml" and including an XML body containing a <mcpttinfo> root element containing a <mcptt-Params> element containing an <anyExt> element with the <request-type> element set to a value of "fa-group-assn-req". Such requests are disclosed herein as "SIP MESSAGE request for association of a functional alias with the MCPTT group(s) for controlling MCPTT function."

Warning texts—Table 2 below illustrates the warning texts that are defined for the Warning header field when a Warning header field is included in a response to an SIP MESSAGE request for enabling or disabling the storage of an MCPTT communication storage control request.

TABLE 2

| Code | Explanatory text | Description |
| --- | --- | --- |
| xyz | user not authorized to request for association of a functional alias with the MCPTT group(s) | The function is not enabled for this user. |
| abc | unable to determine target functional alias or group for creating an association | The MCPTT server is unable to determine the targeted functional alias or group for creating an association |
| kgk | MCPTT group binding already exists with another functional alias | The requested functional alias binding with MCPTT group already exists with another functional alias |

Functional alias to group binding association procedures describes the MCPTT client procedures, participating MCPTT function procedures and controlling MCPTT function procedures for on-network functional alias association with MCPTT group(s). The MCPTT user can associate the same functional alias with multiple MCPTT groups but multiple functional alias cannot be associated with the same MCPTT group.

MCPTT client procedures: On request from MCPTT user at MCPTT client device (100), a request to associate afunctional alias with a group is initiated to the participating MCPTT function.

Functional alias to group binding—Upon receiving a request from the MCPTT user to send a request to associate a functional alias with an MCPTT group or a list of MCPTT groups, if the <allow-functional-alias-association-with-group> element of the <ruleset> element is not present in the MCPTT user profile document (see the MCPTT user profile document in 3GPP TS 24.484) or is set to a value of "false", the MCPTT client device shall inform the MCPTT user and shall end this procedure.

Upon receiving a request from the MCPTT user to send a request to bind the functional alias with an MCPTT group, the MCPTT client device shall generate an SIP MESSAGE request in accordance with 3GPP TS 24.229 and IETF RFC 3428 with the clarifications given below. The MCPTT client device includes a request-URI set to the public service identity identifying the originating participating MCPTT function serving the MCPTT user, includes the ICSI value "urn.urn-7:3gpp-service.ims.icsi.mcptt" (coded as specified in 3GPP TS 24.229), in a P-Preferred-Service header field according to IETF RFC 6050, where IMS refers to an Internet protocol multimedia subsystem and ICSI refers to an IMS communication service identifier, includes an accept-contact header field containing the g.3gpp.mcptt media feature tag along with the "require" and "explicit" header field parameters according to IETF RFC 3841, includes an accept-contact header field with the media feature tag g.3gpp.icsi-ref with the value of "urn:urn-7: 3gpp-service.ims.icsi.mcptt" along with the "require" and "explicit" parameters according to IETF RFC 3841, includes a P-preferred-identity header field in the SIP MESSAGE request containing a public user identity as specified in 3GPP TS 24.229, includes an application/vnd.3gpp.mcptt-info+xml MIME body as specified in clause F.1 with the <mcpttinfo> element containing the <mcptt-Params> element with the <request-type> element set to a value of "fa-group-assn-req", the <bind-assn-ind> element set to a value of "true", the <associating-fa-uri> element set to the URI of a functional alias which will be associated with the specified list of MCPTT groups in an application/resource-lists+xml MIME body, the <mcptt-client-id> element set to the MCPTT client ID of the originating MCPTT client; and if the MCPTT client device needs to include an active functional alias in the SIP MESSAGE request, the <functional-alias-URI> set to the URI of the used functional alias, includes an application/resource-lists+xml MIME body with one or more <entry> elements containing a "uri" attribute set to an MCPTT group ID; and finally, sends the SIP MESSAGE request according to rules and procedures of 3GPP TS 24.229.

On receiving an SIP 2xx response to the SIP MESSAGE request, the MCPTT client device informs the MCPTT user of the successful association of a functional alias with an MCPTT group or list of MCPTT groups.

On receiving an SIP 4xx response an SIP 5xx response or an SIP 6xx response to the SIP MESSAGE request, the MCPTT client device informs the MCPTT user of the unsuccessful association of a functional alias with an MCPTT group or list of MCPTT groups, considering Warning header information for the failure reason.

Functional alias to group unbinding—Upon receiving a request from the MCPTT user to send a request to disassociate a functional alias with an MCPTT group or a list of MCPTT groups, if the <allow-functional-alias-association-with-group> element of the <ruleset> element is not present in the MCPTT user profile document (see the MCPTT user profile document in 3GPP TS 24.484) or is set to a value of "false", the MCPTT client device informs the MCPTT user and shall exit this procedure.

Upon receiving a request from an MCPTT user to send a request to unbind the functional alias with the MCPTT group, the MCPTT client device shall generate an SIP MESSAGE request in accordance with 3GPP TS 24.229 and IETF RFC 3428 with the clarifications given below. The MCPTT client device includes a request-URI set to the public service identity identifying the originating participating MCPTT function serving the MCPTT user, includes the ICSI value "urn:urn-7:3gpp-service.ims.icsi.mcptt" (coded as specified in 3GPP TS 24.229), in a P-preferred-service header field according to IETF RFC 6050, includes an accept-contact header field containing the g.3gpp.mcptt media feature tag along with the "require" and "explicit" header field parameters according to IETF RFC 3841, includes an accept-contact header field with the media feature tag g.3gpp.icsi-ref with the value of "urn:urn-7: 3gpp-service.ims.icsi.mcptt" along with parameters "require" and "explicit" according to IETF RFC 3841, includes a P-preferred-identity header field in the SIP MESSAGE request containing a public user identity as specified in 3GPP TS 24.229, includes an application/vnd.3gpp.mcptt-info+xml MIME body as specified in clause F.1 with the <mcpttinfo> element containing the <mcptt-Params> element with the <request-type> element set to a value of "fa-group-assn-req", the <bind-assn-ind> element set to a value of "false", the <disassociating-fa-uri> element set to the URI of a functional alias which will be disassociated with the specified list of MCPTT groups in an application/resource-lists+xml MIME body, the <mcptt-client-id> element set to the MCPTT client ID of the originating MCPTT client; and if the MCPTT client device needs to include an active functional alias in the SIP MESSAGE request, the <functional-alias-URI> set to the URI of the used functional alias, includes an application/resource-lists+xml MIME body with one or more <entry> elements containing a "uri" attribute set to an MCPTT group ID, and finally, sends the SIP MESSAGE request according to rules and procedures of 3GPP TS 24.229.

On receiving an SIP 2xx response to the SIP MESSAGE request, the MCPTT client device informs the MCPTT user of the successful disassociation of a functional alias with an MCPTT group or list of MCPTT groups.

On receiving an SIP 4xx response an SIP 5xx response or an SIP 6xx response to the SIP MESSAGE request, the MCPTT client device informs the MCPTT user of the unsuccessful disassociation of a functional alias with an MCPTT group or list of MCPTT groups, possibly considering Warning header information for the failure reason.

Participating MCPTT function procedure: The participating MCPTT function has procedures to receive a request for association of a functional alias with the MCPTT group(s) from the MCPTT client device.

Receipt of an SIP MESSAGE request for association of a functional alias with the MCPTT rou(s)—Upon receipt of a "SIP MESSAGE request for association of a functional alias with the MCPTT group(s) for originating participating MCPTT function", the participating MCPTT function:

if unable to process the request due to a lack of resources or a risk of congestion exists, may reject the SIP MESSAGE request with an SIP 500 (server internal error) response. The participating MCPTT function may include a retry-after header field to the SIP 500 response as specified in IETF RFC 3261 and refrain from performing the remaining steps;

determines the MCPTT ID of the calling user from the public user identity in the P-asserted-identity header field of the SIP MESSAGE request; (The MCPTT ID of the calling user is bound to the public user identity at the time of service authorization.)

if the participating MCPTT function cannot find a binding between the public user identity and an MCPTT ID or if the validity period of an existing binding has expired, then the participating MCPTT function rejects the SIP MESSAGE request with an SIP 404 (Not Found) response with the warning text set to "141 user unknown to the participating function" in a Warning header field and discontinues performing the remaining steps;

if the <request-type> element in the application/vnd.3gpp.mcptt-info+xml MIME body of the SIP MESSAGE request is set to a value of "fa-group-assn-req" and the <allow-functional-alias-association-with-group> element of the <rule set> element is not present in the MCPTT user profile document (see the MCPTT user profile document in 3GPP TS 24.484) or is set to a value of "false", rejects the SIP MESSAGE request with an SIP 403 (Forbidden) response including warning text set to "xyz user not authorized to request for association of a functional alias with the MCPTT group(s)" in a Warning header field, and refrain from performing the remaining steps;

the SIP MESSAGE request do not contain an application/resource-lists MIME body or the <bind-assn-ind> element and the <associating-fa-uri> element in the application/vnd.3gpp.mcptt-info+xml MIME body, rejects the SIP MESSAGE request with an SIP 403 (Forbidden) response including warning text set to "abc unable to determine target functional alias or group for creating an association" in a Warning header field, and refrain from performing the remaining steps; and the SIP MESSAGE request do not contain an application/resource-lists MIME body or the <bind-assn-ind> element and the <disassociating-fa-uri> element in the application/vnd.3gpp.mcptt-info+xml MIME body, rejects the SIP MESSAGE request with an SIP 403 (Forbidden) response including warning text set to "abc unable to determine target functional alias or group for creating an association" in a Warning header field, and refrain from performing the remaining steps;

generates an SIP MESSAGE request in accordance with 3GPP TS 24.229 and IETF RFC 3428;

sets the Request-URI of the outgoing SIP MESSAGE request to the public service identity of the controlling MCPTT function for the association of a functional alias with the MCPTT group(s) service associated with the originating user's MCPTT ID identity;

copies the contents of the application/vnd.3gpp.mcptt-info+xml MIME body in the received SIP MESSAGE request into an application/vnd.3gpp.mcptt-info+xml MIME body as specified in clause F.1 included in the outgoing SIP MESSAGE request;

if the received SIP MESSAGE request contains a <functional-alias-URI> element of the application/vnd.3gpp.mcptt-info+xml MIME body, checks the status of the functional alias for the MCPTT ID. If the functional alias status is activated, then the participating MCPTT function sets the <functional-alias-URI> element of the application/vnd.3gpp.mcptt-info+xml MIME body in the outgoing SIP MESSAGE request to the received value, otherwise it shall not include a <functional-alias-URI> element;

sets the <mcptt-calling-user-id> element of the <mcptt-info> element containing the <mcptt-Params> element to the MCPTT ID determined in step 2) above;

copies the contents of the application/resource-lists multipurpose Internet mail extension (MIME) body in the received SIP MESSAGE request into an application/resource-lists MIME body in the outgoing SIP MESSAGE request;

sets the P-asserted-identity in the outgoing SIP MESSAGE request to the public user identity in the P-Asserted-Identity header field contained in the received SIP MESSAGE request; and includes an accept-contact header field containing the g.3gpp.mcptt media feature tag along with the "require" and "explicit" header field parameters according to IETF RFC 3841;

includes an accept-contact header field with the media feature tag g.3gpp.icsi-ref with the value of "urn:urn-7:3gpp-service.ims.icsi.mcptt" along with parameters "require" and "explicit" according to IETF RFC 3841;

includes the ICSI value "urn:urn-7:3gpp-service.ims.icsi.mcptt" (coded as specified in 3GPP TS 24.229), into the P-asserted-service header field of the outgoing SIP MESSAGE request; and sends the SIP MESSAGE request to the controlling MCPTT function as specified in 3GPP TS 24.229.

Upon receipt of an SIP 2xx response in response to the SIP MESSAGE request sent in step 15):

1. generates an SIP 200 (OK) response as specified in 3GPP TS 24.229 with the public user identity received in the P-asserted-identity header field of the incoming SIP 200 (OK) response into the P-Asserted-Identity header field of the outgoing SIP 200 (OK) response; and 2. sends the SIP 200 (OK) response to the MCPTT client device according to 3GPP TS 24.229.

Upon receipt of an SIP 4xx, 5xx or 6xx response to the SIP MESSAGE request, shall forward the error response to the MCPTT client device.

Controlling MCPTT Function Procedures:

Receipt of an SIP MESSAGE request for association of a functional alias with the MCPTT group(s)—Upon receiving a "SIP MESSAGE request for association of a functional alias with the MCPTT group(s) for controlling MCPTT function"; the controlling MCPTT function— if unable to process the request due to a lack of resources or a risk of congestion exists, may reject the SIP MESSAGE request with an SIP 500 (Server Internal Error) response. The controlling MCPTT function may include a Retry-After header field to the SIP 500 response as specified in IETF RFC 3261 and refrain from performing the remaining steps;

rejects the SIP request with an SIP 403 (Forbidden) response and refrain from performing the remaining steps if an accept-contact header field does not include the g.3gpp.icsi-ref media feature tag containing the value of "urn:urn-7:3gpp-service.ims.icsi.mcptt";

the SIP MESSAGE request do not contain an application/resource-lists MIME body or the <bind-assn-ind> element and the <associating-fa-uri> element in the application/vnd.3gpp.mcptt-info+xml MIME body, rejects the SIP MESSAGE request with an SIP 403 (Forbidden) response including warning text set to "abc unable to determine target functional alias or group for creating an association" in a Warning header field, and shall not continue with the rest of the steps in this subclause;

the SIP MESSAGE request do not contain an application/resource-lists MIME body or the <bind-assn-ind> element and the <disassociating-fa-uri> element in the application/vnd.3gpp.mcptt-info+xml MIME body, rejects the SIP MESSAGE request with an SIP 403 (Forbidden) response including warning text set to "abc unable to determine target functional alias or group for creating an association" in a Warning header field, and shall not continue with the rest of the steps in this subclause;

if any of the <entry> element containing a "uri" attribute set to an MCPTT group ID of the incoming SIP MESSAGE request contains an application/resource-lists MIME body having an existing association with any other functional alias with same MCPTT user, rejects the SIP MESSAGE request with an SIP 403 (Forbidden) response including warning text set to "kgk MCPTT group binding already exists with other functional alias" in a Warning header field as specified in clause 4.4, and refrain from performing the remaining steps;

if the application/vnd.3gpp.mcptt-info+xml MIME body of the SIP MESSAGE request contains the <request-type> element set to a value of "fa-group-assn-req" and:

if the <bind-assn-ind> element set to a value of "true", updates or stores the record for the MCPTT client device, and associate a binding information for the functional alias specified in the <associating-fa-uri> element with the list of the MCPTT group(s) included in an application/resource-lists MIME body; or if the <bind-assn-ind> element set to a value of "false", updates or stores the record for the MCPTT client device, and disassociates binding information of the functional alias specified in the <disassociating-fa-uri> element from the list of the MCPTT group(s) included in an application/resource-lists MIME body;

generates an SIP 200 (OK) response as specified in 3GPP TS 24.229 with the follow clarifications:

includes the public user identity in the P-asserted-identity header; and sends the SIP 200 (OK) response to the MCPTT client device according to 3GPP TS 24.229.

Semantic: The existing <mcptt> element of mcptt info xml is extended to include three new parameters. If the <mcpttinfo> contains the <mcptt-Params> element then the <anyExt> can be included with the following elements:

a <request-type> of type "xs:string":

set to value of "fa-group-assn-req" when an MCPTT client device initiates a request for association of a functional alias with the MCPTT group(s);

a <bind-assn-ind> of type "xs:boolean":

set to a value of "true" when it is determined by the user to create a binding of a particular functional alias with the specified list of MCPTT groups for the MCPTT client device; or set to a value of "false" when it is determined by the user to remove a binding of a particular functional alias with the specified list of MCPTT groups for the MCPTT client device;

an <associating-fa-uri> of type "xs:anyURI":

set to a URI of a functional alias which will be associated with the specified list of MCPTT groups for the MCPTT client device; or set to the URI of a functional alias which will be disassociated with the specified list of MCPTT groups for the MCPTT client device;

a <disassociating-fa-uri> of type "xs:anyURI":

set to a URI of a functional alias which will be associated with the specified list of MCPTT groups for the MCPTT client device; or set to the URI of a functional alias which will be disassociated with the specified list of MCPTT groups for the MCPTT client device;

The list of MCPTT group IDs and functional aliases to be associated can be specified by using new schema to create binding or remove the binding using separate standalone request. Steps 6) c) and 7) of "Functional alias to group binding" in above procedure are re-written as follows.

7. includes an application/vnd.3gpp.mcptt-fa-group-assn-request+xml MIME body containing with— a. zero or more <bind> elements with the "fa-uri" attribute set to a particular functional alias URI to which a list of MCPTT groups needs to be associated; and b. each of the included <bind> element contains a list of <group> sub elements with each sub element containing a "uri" attribute set to an MCPTT group uri and having at least one <group> sub element;

Steps 6) c) and 7) of "Functional alias to group unbinding" in above procedure are re-written as follows.

7. Includes an application/vnd.3gpp.mcptt-fa-group-assn-request+xml MIME body containing with:

a. zero or more <unbind> elements with the "fa-uri" attribute set to a particular functional alias URI to which a list of MCPTT groups needs to be disassociated; and b. each of the included <unbind> element contains a list of <group> sub elements with each sub element containing a "uri" attribute set to an MCPTT group uri and having at least one <group> sub element, Step 10) of "Receipt of an SIP MESSAGE request for association of a functional alias with the MCPTT group(s)" participating function procedures disclosed above are re-written as follows.

10. shall copy the contents of the application/vnd.3gpp.mcptt-fa-group-assn-request+xml MIME body in the received SIP MESSAGE request into an application/vnd.3gpp.mcptt-fa-group-assn-request+xml MIME body in the outgoing SIP MESSAGE request;

Steps 6) a) and b) of "Receipt of an SIP MESSAGE request for association of a functional alias with the MCPTT group(s)" controlling function procedures as disclosed above are re-written as follows.

6. if the application/vnd.3gpp.mcptt-info+xml MIME body of the SIP MESSAGE request contains the <request-type> element set to a value of "fa-group-assn-req" and:

a. if the <bind-assn-ind> element set to a value of "true", shall update or store the record for the MCPTT client device, and associate a binding information for the functional alias specified in the "fa-uri" attribute of each <bind> elements in an application/vnd.3gpp.mcptt-fa-group-assn-request+xml MIME body with corresponding <group> sub elements with each sub element containing a "uri" attribute set to an MCPTT group uri; or b. if the <bind-assn-ind> element set to a value of "false", shall update or store the record for the MCPTT client device, and disassociate a binding information for the functional alias specified in the "fa-uri" attribute of each <unbind> elements in an application/vnd.3gpp.mcptt-fa-group-assn-request+xml MIME body from corresponding <group> sub elements with each sub element containing a "uri" attribute set to an MCPTT group uri;

In another embodiment, the list of MCPTT group IDs and functional aliases to be associated can be specified by using new schema to create binding and/or remove the binding using same request.

Instead of two different procedures, "Functional alias to group binding" and "Functional alias to group unbinding" as described above are re-written as one procedure as follows.

MCPTT client procedures: Upon receiving a request from the MCPTT user to send a request to associate a functional alias with an MCPTT group or a list of MCPTT groups, if the <allow-functional-alias-association-with-group> element of the <ruleset> element is not present in the MCPTT user profile document (see the MCPTT user profile document in 3GPP TS 24.484) or is set to a value of "false", the MCPTT client device informs the MCPTT user and shall exit this procedure.

Upon receiving a request from the MCPTT user to send a request to bind the functional alias with the MCPTT group, the MCPTT client shall generate an SIP MESSAGE request in accordance with 3GPP TS 24.229 and IETF RFC 3428 with the clarifications given below. The MCPTT client device:

- includes a request-URI set to the public service identity identifying the originating participating MCPTT function serving the MCPTT user;
- includes the ICSI value "urn:urn-7:3gpp-service.ims.icsi.mcptt" (coded as specified in 3GPP TS 24.229), in a P-Preferred-Service header field according to IETF RFC 6050;
- includes an accept-contact header field containing the g.3gpp.mcptt media feature tag along with the "require" and "explicit" header field parameters according to IETF RFC 3841;
- includes an accept-contact header field with the media feature tag g.3gpp.icsi-ref with the value of "urn:urn-7:3gpp-service.ims.icsi.mcptt" along with the "require" and "explicit" parameters according to IETF RFC 3841;
- may include a P-preferred-identity header field in the SIP MESSAGE request containing a public user identity as specified in 3GPP TS 24.229;
- includes an application/vnd.3gpp.mcptt-info+xml MIME body as specified in clause F.1 with the <mcpttinfo> element containing the <mcptt-Params> element with the <request-type> element set to a value of "fa-group-assn-req", the <mcptt-client-id> element set to the MCPTT client ID of the originating MCPTT client device; and if the MCPTT client device needs to include an active functional alias in the SIP MESSAGE request, the <functional-alias-URI> set to the URI of the used functional alias;
- includes an application/vnd.3gpp.mcptt-fa-group-assn-request+xml MIME body containing with:
  zero or more <bind> elements with the "fa-uri" attribute set to a particular functional alias URI to which a list of MCPTT groups needs to be associated;
  each of the included <bind> element contains a list of <group> sub elements with each sub element containing a "uri" attribute set to an MCPTT group uri and having at least one <group> sub element;
  zero or more <unbind> elements with the "fa-uri" attribute set to a particular functional alias URI from which a list of MCPTT groups needs to be disassociated; and
  each of the included <unbind> element contains a list of <group> sub elements with each sub element containing a "uri" attribute set to an MCPTT group uri and having at least one <group> sub element; and
- sends the SIP MESSAGE request according to rules and procedures of 3GPP TS 24.229.

On receiving an SIP 2xx response to the SIP MESSAGE request, the MCPTT client device informs the MCPTT user of the successful association of a functional alias with an MCPTT group or list of MCPTT groups. On receiving an SIP 4xx response an SIP 5xx response or an SIP 6xx response to the SIP MESSAGE request, the MCPTT client device informs the MCPTT user of the unsuccessful association of a functional alias with an MCPTT group or list of MCPTT groups, considering Warning header information for the failure reason.

Step 10) of "Receipt of an SIP MESSAGE request for association of a functional alias with the MCPTT group(s)" participating function procedures as described above is re-written as follows.

10. shall copy the contents of the application/vnd.3gpp.mcptt-fa-group-assn-request+xml MIME body in the received SIP MESSAGE request into an application/vnd.3gpp.mcptt-fa-group-assn-request+xml MIME body in the outgoing SIP MESSAGE request;

Steps 7) a) and b) of "Receipt of an SIP MESSAGE request for association of a functional alias with the MCPTT group(s)" controlling function procedures as described above are re-written as follows.

7. if the application/vnd.3gpp.mcptt-info+xml MIME body of the SIP MESSAGE request contains the <request-type> element set to a value of "fa-group-assn-req" and:
  a. shall update or store the record for the MCPTT client device, and associate a binding information for the functional alias specified in the "fa-uri" attribute of each <bind> elements in an application/vnd.3gpp.mcptt-fa-group-assn-request+xml MIME body with corresponding <group> sub elements with each sub element containing a "uri" attribute set to an MCPTT group uri; or
  b. shall update or store the record for the MCPTT client device, and disassociate a binding information for the functional alias specified in the "fa-uri" attribute of each <unbind> elements in an application/vnd.3gpp.mcptt-fa-group-assn-request+xml MIME body from corresponding <group> sub elements with each sub element containing a "uri" attribute set to an MCPTT group uri;

Solution 2: The following relates to the method for associating a functional alias to a list of MCPTT groups for an MCPTT user on an MCPTT client device using MCPTT user configuration.

The following method offers the following changes to the MCPTT user profile configuration document (TS 24.484 Clause 8.3.2)—The MCPTT user profile discloses the new element for each functional alias entry. Each functional alias entry can be configured with a list of MCPTT groups to which it is associated. These configurations enable the static association for a functional alias with the MCPTT group(s). The association will be referred to only when the respective functional alias is activated: otherwise; the association does not exist.

The <ListOfAssociatedGroupBindings> element is of type MCPTT ListEntryType.

If the binding for the functional alias association is to be created, each entry of functional alias should be configured with a number of MCPTT group entries defined under the new element <ListOfAssociatedGroupBindings>.

The <entry> element of the <ListOfAssociatedGroupBindings> element in the <anyExt> element of the <entry> element of the <FunctionalAliasList> element within the <anyExt> element of the <OnNetwork> element contains a functional alias with which the MCPTT user is authorized to receive a call if this function is activated and the parent functional alias (see <FunctionalAliasList> element) is being used.

Solution 3: The below solution relates to the method for associating a functional alias to an MCPTT group while establishing a communication for an MCPTT user on an MCPTT client device using response to a call request. This solution can co-exist with solution 1. If the MCPTT user has not created any MCPTT group binding with functional alias at MCPTT server, the MCPTT client device can indicate the association with a group during the communication for duration of the call.

In case of on-demand session, on receiving call setup request, based on the local configuration, the call setup response can include the functional alias to be associated to the MCPTT group to which the call is being setup. The new element <associating-fa-uri> element set to the URI of a functional alias that will be associated with the specified MCPTT group in the application/vnd.3gpp.mcptt-info+xml MIME body of outgoing 200OK response. The controlling MCPTT function can store the association for the duration of the call or beyond.

MCPTT client procedures: Upon receipt of an initial SIP INVITE request, the MCPTT client device follows the procedures for termination of multimedia sessions in the IP multimedia core network (IM CN) subsystem as specified in 3GPP TS 24.229 with the clarifications below. The MCPTT client device:

validates the required headers and parameters in the SIP INVITE request and other validation;

displays to the MCPTT user the functional alias of the inviting MCPTT user;

accepts the SIP INVITE request and generate an SIP 200 (OK) response according to rules and procedures of 3GPP TS 24.229;

sets the required headers and parameters in SIP 200 (OK) response;

includes, based on the local policy, in an SIP 200 (OK) response, an application/vnd.3gpp.mcptt-info+xml MIME body as defined in clause F.1 with the <associating-fa-uri> element set to the URI of a functional alias that will be associated with the MCPTT group for a duration of a call on which the communication is initiated; and sends the SIP 200 (OK) response towards the MCPTT server according to rules and procedures of 3GPP TS 24.229.

Controlling MCPTT function procedures—Upon receiving an SIP 200 (OK) response for the SIP INVITE request the controlling MCPTT function— interacts with the media plane as specified in 3GPP TS 24.380 clause 6.3;

if the application/vnd.3gpp.mcptt-info+xml MIME body of the SIP 200 (OK) response contains the <associating-fa-uri>, updates or stores the record for the MCPTT client device, and associate a binding information for the functional alias specified in the <associating-fa-uri> element with the MCPTT group on which communication is established and MCPTT group binding association is for the duration of the call; and sends an SIP NOTIFY request to all participants with a subscription to the conference event package as specified in clause 10.1.3.4.

In case of a pre-established session, on receiving call setup request using Pre-established session call control, based on the local configuration, the call setup response (i.e. Acknowledge message) can carry the functional alias to be associated to the MCPTT group to which the call is being setup. The new pre-established session call control specific data field "Associating Functional Alias URI" set to the URI of a functional alias that will be associated with the specified MCPTT group in the Acknowledge message response for the connect message. The controlling MCPTT function can store the association for the duration of the call or beyond.

Table 3 below describes newly added pre-established session call control specific data fields.

TABLE 3

| Field name | Field ID Decimal | Field ID Binary | Reference |
|---|---|---|---|
| Associating Functional Alias URI | 195 | 1100 0011 | Clause 8.3.3.14 |

Associating functional alias RI field: The associating functional alias URI field contains the activated functional alias of the MCPTT user who has requested to associate activated functional alias with the MCPTT group on which the communication requested and MCPTT group binding association is for the duration of the call.

Table 4 below describes the coding of the associating functional alias URI field.

TABLE 4

```
        0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
               |Associating|Associating|Associating|
               |Functional | Functional | Functional  |
               |Alias URI  | Alias URI  | Alias URI   |
                   |field ID value|length value|    |
               +-+-+-+-+-+-+-+-+-+-+-+-+-+-+-+-+   :
                               :   (Padding)  :
 +-+-+-+-+-+-+-+-+-+-+-+-+-+-+-+-+-+-+-+-+-+-+-+-+-+-+-+-+-+-+-+-+
```

The <Associating Functional Alias URI field ID> value is a binary value and is set according to Table 3.

The <Associating Functional Alias URI length> value is a binary value indicating the length in octets of the <Associating Functional Alias URI> value item except padding.

The <Associating Functional Alias URI> value contains the activated Functional Alias of the MCPTT user to associate activated functional alias with the MCPTT group on which the communication is requested. The <Associating Functional Alias URI> value shall be coded as specified in Table 5 below.

ABNF syntax of string values of the <Associating Functional Alias URI> value

TABLE 5

Associating-Functional-Alias-URI = URI

If the length of the <Associating Functional Alias URI> value is not (2+multiple of 4) bytes, the <Associating Functional Alias URI> value shall be padded to (2+multiple of 4) bytes. The value of the padding bytes is set to zero. The padding bytes are disregarded.

Acknowledge message: The newly added fields are included in the acknowledge message as defined in Table 6 below.

TABLE 6

```
                    0 1 2 3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Associating Functional Alias URI field      |
+-+-+-+-+-+-+-+-+-+-+-+-+-+-+-+-+-+-+-+-+-+-+-+-+-+-+-+-+-+-+-+-+
```

Associating Functional Alias URI: The Associating Functional Alias URI field is coded as described in clause 8.3.3.14.

Call setup control over pre-established session state machine for MCPTT client device:

Receive Connect message (R: Connect): Upon reception of a Connect message:

if the MCPTT client device accepts the incoming call the MCPTT client device sends the Acknowledge message with a Reason Code field set to 'Accepted' and based on local policy, and includes the Associating Functional Alias URI field set to activated Functional Alias of the MCPTT user to associate with the MCPTT group on which the communication requested.

Call setup control over pre-established session state machine for participating MCPTT function:

Receive Acknowledge message ((R: successful Ack) or (R: failure Ack)): Upon receiving an Acknowledge message from the MCPTT client device, the participating MCPTT function:

if the Acknowledge message contains the Associating Functional Alias URI field, includes in an SIP 200 (OK) response an application/vnd.3gpp.mcptt-info+xml MIME body as defined in clause F.1 with the <associating-fa-uri> element set to a value received in the Associating Functional Alias URI field;

sends an SIP 200 (OK) response to the SIP INVITE request as specified in 3GPP TS 24.379, if the SIP 200 (OK) response to the SIP INVITE request is not already sent; and remains in the 'G: Pre-established session in use' state.

Figure 6:
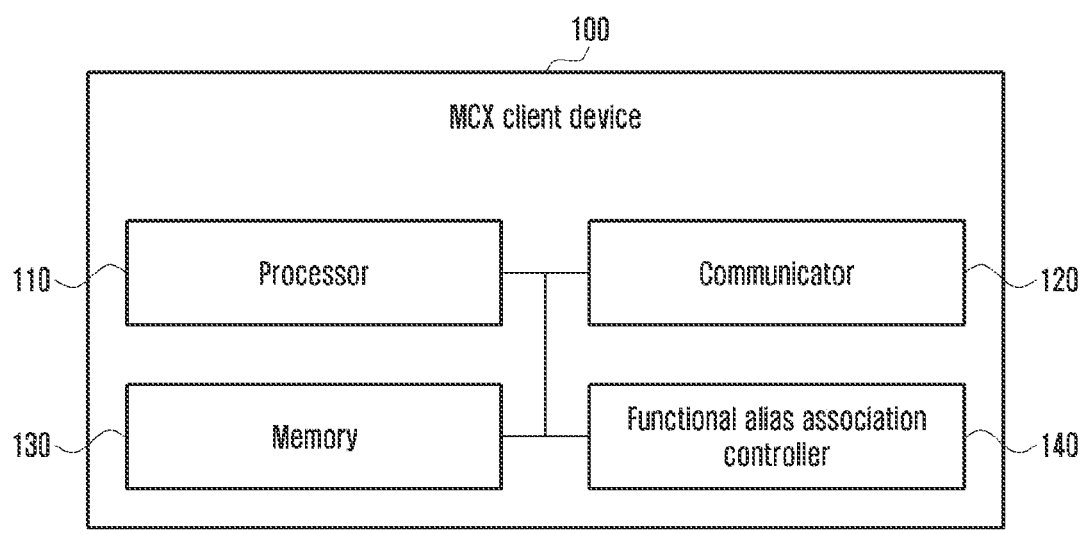
FIG. 6 illustrates hardware components of the MCPTT client device, according to an embodiment.

FIG. 6 illustrates hardware components of the MCX client device 600 (i.e., MCPTT client device), according to an embodiment. The MCX client device includes a processor (610), a communicator (620), a memory (630) and a functional alias association controller (640). The processor (610) is coupled with the communicator (620), the memory (630) and the functional alias association controller (640).

The functional alias association controller (640) creates the SIP message request to create a binding with or remove the binding of functional alias with the at least one MCX group in the MCX network.

The functional alias association controller (640) creates the SIP message request to create binding of the functional alias for the at least one MCX group in the MCX network by configuring the request-URI to the public service identity identifying participating MCX function serving the MCX client device, including an ICSI value "urn:urn-7:3gpp-service.ims.icsi.mcptt" in a P-preferred-service header field, including an accept-contact header field containing a g.3gpp.MCX media feature tag along with parameters "require" and "explicit" header field parameters, including an accept-contact header field with the media feature tag g.3gpp.icsi-ref with a value of "urn:urn-7:3gpp-service.ims.icsi.mcptt" along with parameters "require" and "explicit", including a P-Preferred-Identity header field in the SIP message request containing a public user identity, including an application body with the MCX information element containing an MCX parameter element with a request-type element set to a value of "fa-group-binding-req", a binding-ind (indicator) element set to a value of "true", a binding-fa-uri element set to the URI of an activated functional alias that is to be bind with a specified list of at least one MCX group in an application body, an MCX client ID element set to an MCX client ID of the originating MCX client, and a functional-alias-URI set to a URI of a used functional alias when the MCX client needs to include an active functional alias in the SIP MESSAGE REQUEST, and including an application body with one or more entry elements containing a "uri" attribute set to at least one MCX group ID of the at least one MCX group.

The functional alias association controller (640) creates the SIP message request to remove the binding of the functional alias with the at least one MCX group in the MCX network by configuring the Request-URI to a public service identity identifying a participating MCX function serving the MCX user, including the ICSI value "urn:urn-7:3gpp-service.ims.icsi.mcptt" in a P-preferred-service header field, including an accept-contact header field containing a g.3gpp.MCX media feature tag along with parameters "require" and "explicit" header field parameters, including an accept-contact header field with a media feature tag g.3gpp.icsi-ref with a value of "urn.urn-7:3gpp-service.ims.icsi.mcptt" along with parameters "require" and "explicit", including a P-preferred-identity header field in the SIP message request containing a public user identity, including an application body with the MCX information element containing an MCX parameters element with a request-type element set to a value of "fa-group-binding-req", a binding-ind element set to a value of "false", an unbinding-fa-uri element set to a URI of the functional alias that is to be unbound with the specified list of MCX groups in an application body, an MCPTT-client-id element set to the MCX client ID of the originating MCX client, and a functional-alias-URI set to a URI of a used functional alias when the MCX client device includes an active functional alias in the SIP message request, and including an application body with one or more <entry> elements containing a "uri" attribute set to at least one MCX group ID of the at least one MCX group.

The functional alias association controller (640) sends the SIP message request to the MCX server to create a binding with or remove the binding of the functional alias with the at least one MCX group.

The functional alias association controller (640) receives the SIP message response from the MCX server confirming whether the creation with or removal of binding of the functional alias with the at least one MCX group is successful or unsuccessful. The SIP message response includes a warning header indicating a failure reason when the creation with or removal of binding of the functional alias with the at least one MCX group is unsuccessful.

The functional alias association controller (640) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (610) is configured to execute instructions stored in the memory (630) and to perform various processes. The communicator (620) is configured for communicating internally between internal hardware components and with external devices via one or more networks. The memory (630) also stores instructions to be executed by the processor (610). The memory (630) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (630) may, in some examples, be considered a non-transitory storage medium. The term "non-transitory" may indicate that the storage medium is not embodied in a propagated signal. However, the term "non-transitory" should not be interpreted such that the memory (630) is non-movable. In certain examples, a non-transitory storage medium may store data that can, over time, change (e.g., in a random access memory (RAM) or cache).

Although FIG. 6 illustrates hardware components of the MCX client device, it is to be understood that other embodiments are not limited thereon. In other embodiments, the MCX client device may include a different number of components. The labels or names of the components are used only for illustrative purposes and do not limit the scope of the disclosure. One or more components can be combined together to perform same or substantially similar function in the MCX client device.

Figure 7:
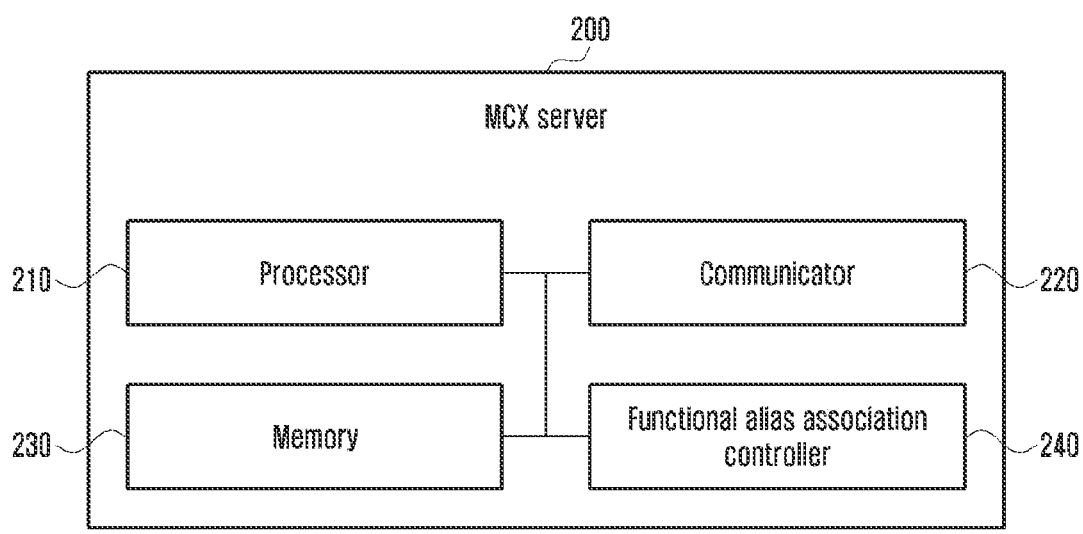
FIG. 7 illustrates hardware components of an MCPTT server, according to an embodiment.

FIG. 7 illustrates hardware components of the MCX server (700) (i.e., MCPTT server), according to an embodiment. The MCX server (700) includes a processor (710), a communicator (720), a memory (730) and a functional alias association controller (740). The processor (710) is coupled with the communicator (720), the memory (730) and the functional alias association controller (740).

The functional alias association controller (740) receives the SIP message request to the MCX client device to create a binding of the functional alias with or remove the binding of the functional alias with the at least one MCX group. The SIP message request includes a request-URI configured to a public service identity identifying participating MCX function serving the MCX client device, an ICSI value "urn:urn-7:3gpp-service.ims.icsi.mcptt" in a P-Preferred-Service header field, an Accept-Contact header field containing a g.3gpp.MCX media feature tag along with parameters "require" and "explicit" header field parameters, an Accept-Contact header field with the media feature tag g.3gpp.icsi-ref with a value of "urn:urn-7:3gpp-service.ims.icsi.mcptt" along with parameters "require" and "explicit", a P-preferred-identity header field in the SIP message request containing a public user identity, an application body with the MCX information element containing an MCX parameter element with a request-type element set to a value of "fa-group-binding-req", a binding-ind element set to a value of "true", a binding-fa-uri element set to the URI of an activated functional alias that is to be bind with a specified list of at least one MCX group in an application body, an MCX client ID element set to an MCX client ID of the originating MCX client, and a functional-alias-URI set to a URI of a used functional alias when the MCX client needs to include an active functional alias in the SIP MESSAGE REQUEST, and an application body with one or more entry elements containing a "uri" attribute set to at least one MCX group ID of the at least one MCX group.

In another embodiment, the SIP message request includes a request-URI configured to a public service identity identifying a participating MCX function serving the MCX user, an ICSI value "urn:urn-7:3gpp-service.ims.icsi.mcptt" in a P-Preferred-Service header field, an Accept-Contact header field containing a g.3gpp.MCX media feature tag along with parameters "require" and "explicit" header field parameters, an Accept-Contact header field with a media feature tag g.3gpp.icsi-ref with a value of "urn:urn-7:3gpp-service.ims.icsi.mcptt" along with parameters "require" and "explicit", a P-preferred-identity header field in the SIP message request containing a public user identity, an application body with the MCX information element containing an MCX parameters element with a request-type element set to a value of "fa-group-binding-req", a binding-ind element set to a value of "false", an unbinding-fa-uri element set to a URI of the functional alias that is to be unbound with the specified list of MCX groups in an application body, an MCPTT-client-id element set to the MCX client ID of the originating MCX client, and a functional-alias-URI set to a URI of a used functional alias when the MCX client device needs to include an active functional alias in the SIP message request, and an application body with one or more <entry> elements containing a "uri" attribute set to at least one MCX group ID of the at least one MCX group.

The functional alias association controller (740) authorizes the MCX client device in response to receiving the SIP message request.

The functional alias association controller (740) creates or updates the associated of the functional alias with the at least one MCX group when the SIP message request is received to create binding of the functional alias with the at least one MCX group. The functional alias association controller (740) disassociates the associated functional alias with at least one MCX group when the SIP message request is received to remove the binding of the functional alias with at least one MCX group.

The functional alias association controller (740) sends the SIP message response to the MCX client device confirming whether the creation with or removal of binding of the functional alias with at least one MCX group is successful or unsuccessful. The SIP message response includes a warning header indicating a failure reason when the creation with or removal of binding of the functional alias with the at least one MCX group is unsuccessful.

The functional alias association controller (740) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (710) is configured to execute instructions stored in the memory (730) and to perform various processes. The memory (730) includes information of the at least one MCX group. The communicator (720) is configured for communicating internally between internal hardware components and with external devices via one or more networks. The memory (730) also stores instructions to be executed by the processor (710). The memory (730) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (730) may, in some examples, be considered a non-transitory storage medium. The term "non-transitory" may indicate that the storage medium is not embodied in a propagated signal. However, the term "non-transitory" should not be interpreted that the memory (730) is non-movable. In certain examples, a non-transitory storage medium may store data that can, over time, change (e.g., in Random Access Memory (RAM) or cache).

Although the FIG. 7 illustrates hardware components of the MCX server, it is to be understood that other embodiments are not limited thereon. In other embodiments, the MCX server (700) may include a different number of components.

Figure 8:
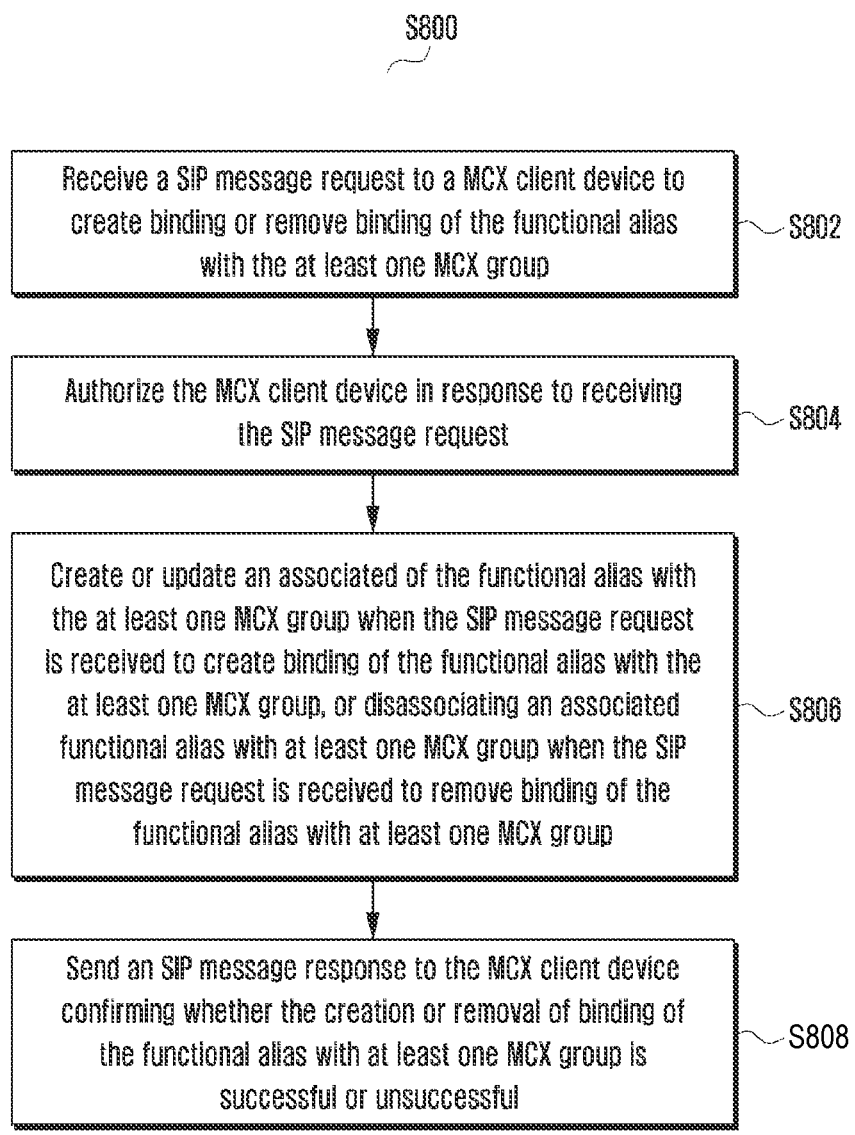
FIG. 8 illustrates a method, implemented by the MCX server, for binding or unbinding the functional alias with at least one MCX group in an MCX network, according to an embodiment.

FIG. 8 is a flow chart (S800) illustrating a method, implemented by the MCX server, for binding or unbinding the functional alias with at least one MCX group in the MCX network (1000), according to an embodiment. Steps (S802-S808) are performed by the functional alias association controller (740).

In step S802, the method includes receiving the SIP message request to the MCX client device to create a binding of the functional alias with or remove the binding of the functional alias with the at least one MCX group. In step S804, the method includes authorizing the MCX client device in response to receiving the SIP message request. In step S806, the method includes creating or updating the associated of the functional alias with the at least one MCX group when the SIP message request is received to create a binding of the functional alias with the at least one MCX group, or disassociating the associated functional alias with at least one MCX group when the SIP message request is received to remove the binding of the functional alias with at least one MCX group. In step S808, the method includes sending the SIP message response to the MCX client device confirming whether the creation with or removal of binding of the functional alias with at least one MCX group is successful or unsuccessful.

Figure 9:
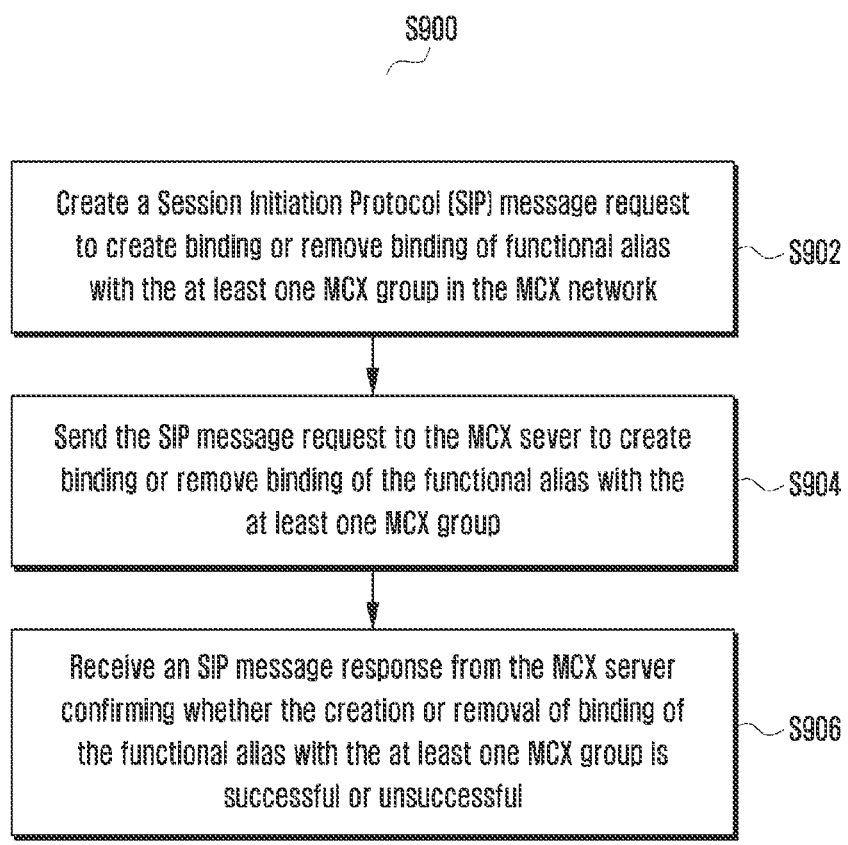
FIG. 9 illustrates a method, implemented by the MCX client device, for binding or unbinding the functional alias with at least one MCX group in the MCX network, according to an embodiment.

FIG. 9 is a flow chart (S900) illustrating a method, implemented by the MCX client device, for binding or unbinding the functional alias with the at least one MCX group in the MCX network, according to an embodiment. Steps (S902-S906) are performed by the functional alias association controller (140).

In step S902, the method includes creating the SIP message request to create binding or remove the binding of functional alias with the at least one MCX group in the MCX network (1000). In step S904, the method includes sending the SIP message request to the MCX server to create a binding of the functional alias with or remove the binding of the functional alias with the at least one MCX group. In step S906, the method includes receiving the SIP message response from the MCX server confirming whether the creation or removal of binding of the functional alias with the at least one MCX group is successful or unsuccessful.

The various actions, acts, blocks, steps, or the like in the above embodiments may be performed in the order presented, in a different order or simultaneously. Some of the actions, acts, blocks, steps, or the like may be omitted, added, modified, or skipped, without departing from the scope of the disclosure.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. A method performed by a mission critical services (MCX) server for binding a functional alias with or unbinding the functional alias with at least one MCX group in an MCX network, comprising:
   receiving, from an MCX client device, a session initiation protocol (SIP) message request to create the binding of the functional alias with or remove the binding of the functional alias with the at least one MCX group;
   authorizing, the MCX client device in response to receiving the SIP message request;
   creating or updating, an association of the functional alias with the at least one MCX group when the SIP message request is received to create the binding of the functional alias with at least one MCX group, or disassociating by the MCX server an association of the functional alias with the at least one MCX group when the SIP message request is received to remove the binding of the functional alias with the at least one MCX group; and
   transmitting, to the MCX client device, an SIP message response confirming whether the creation of the binding of the functional alias with or removal of binding of the functional alias with the at least one MCX group is successful or unsuccessful.

2. The method as claimed in claim 1, wherein the SIP message request comprises at least one of:
   a request-uniform resource identifier (URI) configured to a public service identity identifying participating MCX function serving the MCX client device;
   an internet protocol multimedia subsystem communication service identifier (ICSI) value "urn:urn-7:3gpp-service.ims.icsi.mcptt" in a P-preferred-service header field;
   an accept-contact header field containing a g.3gpp.MCX media feature tag along with parameters "require" and "explicit" header field parameters;
   an accept-contact header field with the media feature tag g.3gpp.icsi-ref with a value of "urn:urn-7:3gpp-service.ims.icsi.mcptt" along with parameters "require" and "explicit";
   a P-preferred-identity header field in the SIP message request containing a public user identity;
   an application body with an MCX information element containing an MCX parameter element with at least one of a request-type element set to a value of "fa-group-binding-req", a binding-ind element set to a value of "true", a binding-fa-uri element set to the URI of an activated functional alias that is to be bind with a specified list of at least one MCX group in an application body, an MCX client ID element set to an MCX client identifier (ID) of the originating MCX client, and a functional-alias-URI set to a URI of a used functional alias when the MCX client includes an active functional alias in the SIP MESSAGE REQUEST; or
   an application body with one or more entry elements containing a "uri" attribute set to at least one MCX group ID of the at least one MCX group.

3. The method as claimed in claim 1, wherein the SIP message request comprises at least one of:
- a request-uniform resource identifier (URI) configured to a public service identity identifying a participating MCX function serving the MCX user;
- an Internet protocol multimedia subsystem communication service identifier (ICSI) value "urn:urn-7:3gpp-service.ims.icsi.mcptt" in a P-preferred-service header field;
- an accept-contact header field containing a g.3gpp.MCX media feature tag along with "require" and "explicit" header field parameters;
- an accept-contact header field with a media feature tag g.3gpp.icsi-ref with a value of "urn:urn-7:3gpp-service.ims.icsi.mcptt" along with the "require" and "explicit" parameters;
- a P-preferred-identity header field in the SIP message request containing a public user identity;
- an application body with an MCX information element containing an MCX parameters element with at least one of a request-type element set to a value of "fa-group-binding-req", a binding-ind element set to a value of "false", an unbinding-fa-uri element set to a URI of the functional alias that is to be unbound with the specified list of MCX groups in an application body, an MCPTT-client-id element set to the MCX client ID of the originating MCX client, and a functional-alias-URI set to a URI of the used functional alias when the MCX client device includes an active functional alias in the SIP message request: or
- an application body with one or more entry elements containing a "uri" attribute set to at least one MCX group ID of the at least one MCX group.

4. The method as claimed in claim 1, wherein the SIP message response comprises a warning header indicating a failure reason when the creation or removal of the binding of the functional alias with the at least one MCX group is unsuccessful.

5. A method performed by a mission critical services (MCX) client device for binding a functional alias with or unbinding the functional alias with at least one MCX group in an MCX network, comprising:
- generating, a session initiation protocol (SIP) message request to create the binding of the functional alias with or remove the binding of functional alias with the at least one MCX group in the MCX network;
- transmitting, to the MCS server, the SIP message request to create the binding of the functional alias with or remove the binding of the functional alias with the at least one MCX group; and
- receiving, from the MCX server, an SIP message response confirming whether the creation or removal of binding of the functional alias with the at least one MCX group is successful or unsuccessful.

6. The method as claimed in claim 5, wherein generating the SIP message request to create the binding of the functional alias with the at least one MCX group in the MCX network comprises at least one of:
- configuring a request-uniform resource identifier (URI) to a public service identity identifying participating MCX function serving the MCX client device;
- including an internet protocol multimedia subsystem communication service identifier (ICSI) value "urn:urn-7:3gpp-service.ims.icsi.mcptt" in a P-preferred-service header field;
- including an accept-contact header field containing a g.3gpp.MCX media feature tag along with "require" and "explicit" header field parameters;
- including an accept-contact header field with the media feature tag g.3gpp.icsi-ref with a value of "urn:urn-7:3gpp-service.ims.icsi.mcptt" along with the "require" and "explicit" parameters;
- including a P-preferred-identity header field in the SIP message request containing a public user identity;
- including an application body with an MCX information element containing an MCX parameter element with at least one of a request-type element set to a value of "fa-group-binding-req", a binding-ind element set to a value of "true", a binding-fa-uri element set to the URI of an activated functional alias that is to be bind with a specified list of the at least one MCX group in an application body, an MCX client identifier (ID) element set to an MCX client ID of the originating MCX client, and a functional-alias-URI set to a URI of a used functional alias when the MCX client needs to include an active functional alias in the SIP MESSAGE REQUEST; or
- including an application body with one or more entry elements containing a "uri" attribute set to at least one MCX group ID of the at least one MCX group.

7. The method as claimed in claim 5, wherein generating the SIP message request to remove the binding of the functional alias with the at least one MCX group in the MCX network comprises at least one of:
- configuring a request-URI to a public service identity identifying a participating MCX function serving the MCX user;
- including an ICSI value "urn:urn-7:3gpp-service.ims.icsi.mcptt" in a P-preferred-Service header field;
- including an accept-contact header field containing a g.3gpp.MCX media feature tag along with parameters "require" and "explicit" header field parameters;
- including an accept-contact header field with a media feature tag g.3gpp.icsi-ref with a value of "urn:urn-7:3gpp-service.ims.icsi.mcptt" along with parameters "require" and "explicit";
- including a P-preferred-identity header field in the SIP message request containing a public user identity;
- including an application body with an MCX information element containing an MCX parameters element with at least one of a request-type element set to a value of "fa-group-binding-req", a binding-ind element set to a value of "false", an unbinding-fa-uri element set to a URI of the functional alias that is to be unbound with the specified list of MCX groups in an application body, an MCPTT-client-id element set to the MCX client ID of the originating MCX client, and a functional-alias-URI set to a URI of a used functional alias when the MCX client device includes an active functional alias in the SIP message request; or
- including an application body with one or more entry elements containing a "uri" attribute set to at least one MCX group ID of the at least one MCX group.

8. The method as claimed in claim 5, wherein the SIP message response comprises a warning header indicating a failure reason when the creation of the binding of the functional alias with or removal of binding of the functional alias with the at least one MCX group is unsuccessful.

9. A mission critical services (MCX) server for binding or unbinding a functional alias with at least one MCX group in an MCX network, comprising:
- a communicator; and
- a functional alias association controller, communicatively coupled to the communicator and configured to:
  - receive a session initiation protocol (SIP) message request to an MCX client device to create the binding of the functional alias with or remove the binding of the functional alias with the at least one MCX group;
  - authorize the MCX client device in response to receiving the SIP message request;
  - create or update an association of the functional alias with the at least one MCX group when the SIP message request is received to create the binding of the functional alias with the at least one MCX group, or disassociating by the MCX server an associated functional alias with at least one MCX group when the SIP message request is received to remove the binding of the functional alias with at least one MCX group; and
  - transmit an SIP message response to the MCX client device confirming whether the creation or removal of the binding of the functional alias with at least one MCX group is successful or unsuccessful.

10. The MCX server as claimed in claim 9, wherein the SIP message request comprises at least one of:
- a request-uniform resource identifier (URI) configured to a public service identity identifying participating MCX function serving the MCX client device;
- an internet protocol multimedia subsystem communication service identifier (ICSI) value "urn:urn-7:3gpp-service.ims.icsi.mcptt" in a P-preferred-service header field;
- an accept-contact header field containing a g.3gpp.MCX media feature tag along with parameters "require" and "explicit" header field parameters;
- an accept-contact header field with the media feature tag g.3gpp.icsi-ref with a value of "urn:urn-7:3gpp-service.ims.icsi.mcptt" along with parameters "require" and "explicit";
- a P-preferred-identity header field in the SIP message request containing a public user identity;
- an application body with an MCX information element containing an MCX parameter element with at least one of a request-type element set to a value of "fa-group-binding-req", a binding-ind element set to a value of "true", a binding-fa-uri element set to the URI of an activated functional alias that is to be bind with a specified list of at least one MCX group in an application body, an MCX client identifier (ID) element set to an MCX client ID of the originating MCX client, and a functional-alias-URI set to a URI of a used functional alias when the MCX client includes an active functional alias in the SIP MESSAGE REQUEST; or
- an application body with one or more entry elements containing a "uri" attribute set to at least one MCX group ID of the at least one MCX group.

11. The MCX server as claimed in claim 9, wherein the SIP message request comprises at least one of:
- a request-uniform resource identifier (URI) configured to a public service identity identifying a participating MCX function serving the MCX user;
- an internet protocol multimedia subsystem communication service identifier (ICSI) value "urn:urn-7:3gpp-service.ims.icsi.mcptt" in a P-preferred-service header field;
- an accept-contact header field containing a g.3gpp.MCX media feature tag along with "require" and "explicit" header field parameters;
- an accept-contact header field with a media feature tag g.3gpp.icsi-ref with a value of "urn:urn-7:3gpp-service.ims.icsi.mcptt" along with the "require" and "explicit" parameters;
- a P-preferred-identity header field in the SIP message request containing a public user identity;
- an application body with an MCX information element containing an MCX parameters element with at least one of a request-type element set to a value of "fa-group-binding-req", a binding-ind element set to a value of "false", an unbinding-fa-uri element set to a URI of the functional alias that is to be unbound with the specified list of MCX groups in an application body, an MCPTT-client-id element set to the MCX client identifier (ID) of the originating MCX client, and a functional-alias-URI set to a URI of a used functional alias when the MCX client device includes an active functional alias in the SIP message request; or
- an application body with one or more entry elements containing a "uri" attribute set to at least one MCX group ID of the at least one MCX group.

12. The MCX server as claimed in claim 9, wherein the SIP message response comprises a warning header indicating a failure reason when the creation or removal of the binding of the functional alias with the at least one MCX group is unsuccessful.

13. A mission critical services (MCX) client device for binding a functional alias with or unbinding the functional alias with at least one MCX group in an MCX network, comprising:
- a communicator; and
- a functional alias association controller communicatively coupled to the communicator and configured to:
  - generate a session initiation protocol (SIP) message request to create the binding of the functional alias with or remove the binding of the functional alias with the at least one MCX group in the MCX network;
  - transmit the SIP message request to the MCX server to create the binding of the functional alias with or remove the binding of the functional alias with the at least one MCX group; and
  - receive an SIP message response from the MCX server confirming whether the creation or removal of the binding of the functional alias with the at least one MCX group is successful or unsuccessful.

14. The MCX client device as claimed in claim 13, wherein the SIP message request to create the binding of the functional alias with the at least one MCX group in the MCX network comprises at least one of:
- configure a request-uniform resource identifier (URI) to a public service identity identifying participating MCX function serving the MCX client device;
- include an internet protocol multimedia subsystem communication service identifier (ICSI) value "urn:urn-7:3gpp-service.ims.icsi.mcptt" in a P-preferred-service header field;
- include an accept-contact header field containing a g.3gpp.MCX media feature tag along with "require" and "explicit" header field parameters;
- include an accept-contact header field with the media feature tag g.3gpp.icsi-ref with a value of "urn:urn-7:3gpp-service.ims.icsi.mcptt" along with the "require" and "explicit" parameters;

include a P-preferred-identity header field in the SIP message request containing a public user identity;

include an application body with an MCX information element containing an MCX parameter element with at least one of a request-type element set to a value of "fa-group-binding-req", a binding-ind element set to a value of "true", a binding-fa-uri element set to the URI of an activated functional alias that is to be bind with a specified list of at least one MCX group in an application body, an MCX client identifier (ID) element set to an MCX client ID of the originating MCX client, and a functional-alias-URI set to a URI of a used functional alias when the MCX client includes an active functional alias in the SIP MESSAGE REQUEST; or include an application body with one or more entry elements containing a "uri" attribute set to at least one MCX group ID of the at least one MCX group.

15. The MCX client device as claimed in claim 13, wherein creating a SIP message request to remove the binding of the functional alias with the at least one MCX group in the MCX network comprises at least one of:

configure a request-uniform resource identifier (URI) to a public service identity identifying a participating MCX function serving the MCX user;

include an internet protocol multimedia subsystem communication service identifier (ICSI) value "urn:urn-7:3gpp-service.ims.icsi.mcptt" in a P-preferred-service header field;

include an accept-contact header field containing a g.3gpp.MCX media feature tag along with "require" and "explicit" header field parameters;

include an accept-contact header field with a media feature tag g.3gpp.icsi-ref with a value of "urn:urn-7:3gpp-service.ims.icsi.mcptt" along with the "require" and "explicit" parameters;

include a P-preferred-identity header field in the SIP message request containing a public user identity;

include an application body with an MCX information element containing an MCX parameters element with at least one of a request-type element set to a value of "fa-group-binding-req", a binding-ind element set to a value of "false", an unbinding-fa-uri element set to a URI of the functional alias that is to be unbound with the specified list of MCX groups in an application body, an MCPTT-client-id element set to an MCX client identifier (ID) of the originating MCX client, and a functional-alias-URI set to a URI of a used functional alias when the MCX client device includes an active functional alias in the SIP message request; or include an application body with one or more entry elements containing a "uri" attribute set to at least one MCX group ID of the at least one MCX group.

16. The MCX client device as claimed in claim 13, wherein the SIP message response comprises a warning header indicating a failure reason when the creation or removal of the binding of the functional alias with the at least one MCX group is unsuccessful.

* * * * *